United States Patent [19]

Lee et al.

[11] Patent Number: 5,754,360
[45] Date of Patent: May 19, 1998

[54] MAGNETIC RECORDING/REPRODUCING APPARATUS

[75] Inventors: Jae-gon Lee; Woon-bae Kim; Young-sik Nam, all of Suwon; Lae-soo Park, Yongin-gun; Jeung-rak Lee, Suwon; Jee-hong Min, Seoul, all of Rep. of Korea

[73] Assignee: Samsung Electronics Co., Ltd., Kyungki-Do, Rep. of Korea

[21] Appl. No.: 759,960

[22] Filed: Dec. 3, 1996

[30] Foreign Application Priority Data

Dec. 22, 1995 [KR] Rep. of Korea .................. 1995-54732

[51] Int. Cl.$^6$ ........................................ G11B 5/027
[52] U.S. Cl. .................................. 360/85; 360/965
[58] Field of Search ........................... 360/85, 95, 84, 360/96.1, 96.3, 96.5

[56] References Cited

U.S. PATENT DOCUMENTS

| | | | |
|---|---|---|---|
| 4,685,008 | 8/1987 | Ohyama et al. | 360/95 X |
| 5,070,422 | 12/1991 | Sasaki et al. | 360/85 |
| 5,126,909 | 6/1992 | Mototake et al. | 360/85 |
| 5,461,520 | 10/1995 | Kobayashi et al. | 360/85 X |

*Primary Examiner*—John H. Wolff
*Attorney, Agent, or Firm*—Sughrue, Mion, Zinn, Macpeak & Seas, PLLC

[57] ABSTRACT

A magnetic recording/reproducing apparatus applicable to a small camcorder is provided, in which tape guide devices are interlocked with a single main slide member and a hard circuit board is used. Therefore, it is easy to assemble and disassemble the apparatus.

25 Claims, 35 Drawing Sheets

MAGNETIC RECORDING/REPRODUCING APPARATUS

BACKGROUND OF THE INVENTION

The present invention relates to a magnetic recording/reproducing apparatus and, more particularly, to a magnetic recording/reproducing apparatus applicable for use as a small digital camcorder, in which information is recorded on/reproduced from a tape by stably placing a tape cassette on reel tables, winding the tape around a rotating drum at a predetermined winding angle, and travelling the tape by a capstan and a pinch roller.

A deck mechanism for recording and reproducing on a magnetic tape with a rotating head drum is employed in a video cassette tape recorder (VCR), a camcorder and a recordable digital audio tape (R-DAT). A deck for such apparatuses includes a cassette loading device for transferring a tape cassette to a predetermined position on the deck, a pair of reel driving tables for placement of two tape reels of the transferred tape cassette thereon and selectively driving either of the tape reels to wind a tape, means for selectively braking the pair of reel driving tables, a tape loading device for loading the tape to a head drum, a tension pole device for maintaining tension by pressing the loaded tape, pinch roller driving means for driving a pinch roller to press the tape against a capstan, and at least one guide for guiding the travelling tape.

The deck mechanism performs the playback of a still image and a slow moving image, high-speed search, and reverse playback which are selectively provided to a product, as well as basic functions such as recording (REC), playback (PLAY), fast forward (FF), and rewind (REW).

To simplify the structure of the deck and enable it to be mechanically stable during operations, it is necessary to improve the operational relationships among the respective parts of the deck, which operate according to a selected mode.

Typically, the cassette loading device and the deck are driven by separate motors and each device of the deck operates independently, thereby increasing structural complexity and costs and lowering productivity.

FIG. 1 schematically illustrates a conventional deck for a camcorder.

The deck is comprised of a main deck 10 having a head drum 11, a capstan motor 14 and a loading motor 15, a subdeck 24 slidably installed on the main deck 10 by the loading motor 15 and having chassis members 20 and 21 at the sides thereof, and a housing assembly 90 rotatably supported by the chassis members 20 and 21, for accommodating a tape cassette 95.

Reel tables 12 and 13 for placing the tape cassette 95 thereon, a pinch roller (not shown) for transferring a tape while pressing the tape against the capstan motor shaft 14, and a tension pole (not shown) for applying a predetermined tension to the travelling tape are installed on the subdeck 24 which slides along the main deck 10 by the loading motor 15.

The housing assembly 90 is provided with a housing 80 for accommodating the tape cassette 95, first and second arm members 30 and 40 combined at one side of the housing 80 and rotating around a pin 35, and third and fourth arm members 50 and 60 combined at the other side thereof and rotating around a pin 55. The arm members 30 and 40, and similarly the arm members 50 and 60, are combined to move like scissors. The first arm member 30 is coupled to the second arm member 40 by a spring member 45, and the third arm member 50 is coupled to the fourth arm member 60 by a spring member 65. Therefore, the housing 80 remains above the deck by the restoring force of the spring members 45 and 65.

The second arm member 40 has guide slots 41 and 42 at its respective ends, and the fourth arm member 60 has guide slots 61 and 62 at its respective ends. The guide slots 42 and 62 are each slidably combined with the respective sides of the housing 80. The guide slot 41 is slidably combined with a guide pin 23 formed on the chassis member 21, and the guide slot 61 with a guide pin 22 formed on the chassis member 20. Engaging pins 34 and 54 are formed at end portions of the first and third arm members 30 and 50, respectively. These individual engaging pins 34 and 54 are rotatably inserted into respective engaging holes 21' and 20' formed in the chassis members 21 and 20, respectively.

A shaft 70 is installed to link inner end portions of both sides of the housing 80, and first and second driven gears 71 and 72 are each combined with the end portions of the shaft 70, respectively. The first arm member 30 has a first sector gear 31 to be engaged with the first driven gear 71, and the third arm member 50 has a second sector gear 51 to be engaged with the second driven gear 72. In addition, a gear portion 52, to be engaged with a damper 73 installed in the housing 80, is formed at an end portion of the third arm member 50.

A locking pin 32 is formed on the second arm member 40, and a locking device (not shown) for locking the locking pin 32 is formed at the chassis member 21 corresponding to the locking pin 32.

A flexible main printing board (not shown) is attached to the lower surface of the main deck 10 and welded to parts such as a loading motor 15.

However, the above deck exhibits the following problems:

1. A predetermined loading time is consumed, which delays driving the deck, since the subdeck 24 moves along the main deck 10. An additional device is required to move the subdeck 24, thus increasing structural complexity;

2. It is difficult to manage parts since the first to fourth arm members 30, 40, 50 and 60 for supporting the housing 80 are independent of one another. Further, their separate operations cause a disparity between the movements of both sides of the housing 80, thereby placing the tape cassette 95 unstably; and 3. Assembly is inefficient since the individual electrical parts are connected by welding to the flexible main printing board.

SUMMARY OF THE INVENTION

To overcome the above problems, it is an object of the present invention to provide a magnetic recording/reproducing apparatus whose structure is improved to be simple and small and which provides stable operation.

It is another object of the present invention to provide a magnetic recording/reproducing apparatus whose parts can be efficiently assembled.

To achieve the above objects, there is provided a magnetic recording/reproducing apparatus comprising: a main deck having sidewalls at both sides and having disposed thereon a supply reel disk and a take-up reel disk having gear portions on the outer surfaces thereof, for stably placing a tape cassette thereon, a supply reel table and a take-up reel table respectively combined with the supply and take-up reel disks by means of the same shaft and including reel gears having gear portions on the outer surfaces thereof, a rotatable head drum having a magnetic head mounted thereon, a capstan motor installed at one side of the head drum, for generating force, and a loading motor for supplying a drive force installed at one side of the reel tables; a main slide member installed on the main deck to slide by the drive force of the loading motor; a holder assembly rotatably supported by both sidewalls of the main deck, and having a holder for accommodating the tape cassette; locking means for locking the holder assembly in the main deck and releasing the holder assembly from the main deck; tape loading means for interlocking with the main slide member and loading a tape from the tape cassette stably placed on the reel tables toward the head drum; tape transferring means for interlocking with the main slide member and transferring the tape, while pressing the tape against a capstan motor shaft; reel driving means for selectively transferring the force of the capstan motor to the supply and take-up reel tables to travel the tape; tension controlling means for rotating by interlocking with the main slide member and applying a predetermined tension to the travelling tape; first brake means for interlocking with the main slide member and frictionally rotating/braking the supply reel disk; second brake means for interlocking with the main slide member and frictionally rotating the take-up reel disk; third brake means for interlocking with the loading motor and braking the take-up reel disk; and tape sensing means for sensing the specification of a magnetic tape in the tape cassette stably placed on the reel tables.

The recording/reproducing apparatus of the present invention is simple and small, since its parts are interlocked with one another by the single main slide member which moves according to a mode of operation.

BRIEF DESCRIPTION OF THE DRAWINGS

The above objects and advantages of the present invention will become more apparent by describing in detail preferred embodiments thereof with reference to the accompanying drawings, in which.

DETAILED DESCRIPTION OF THE PREFERRED EMBODIMENTS

Figure 1:
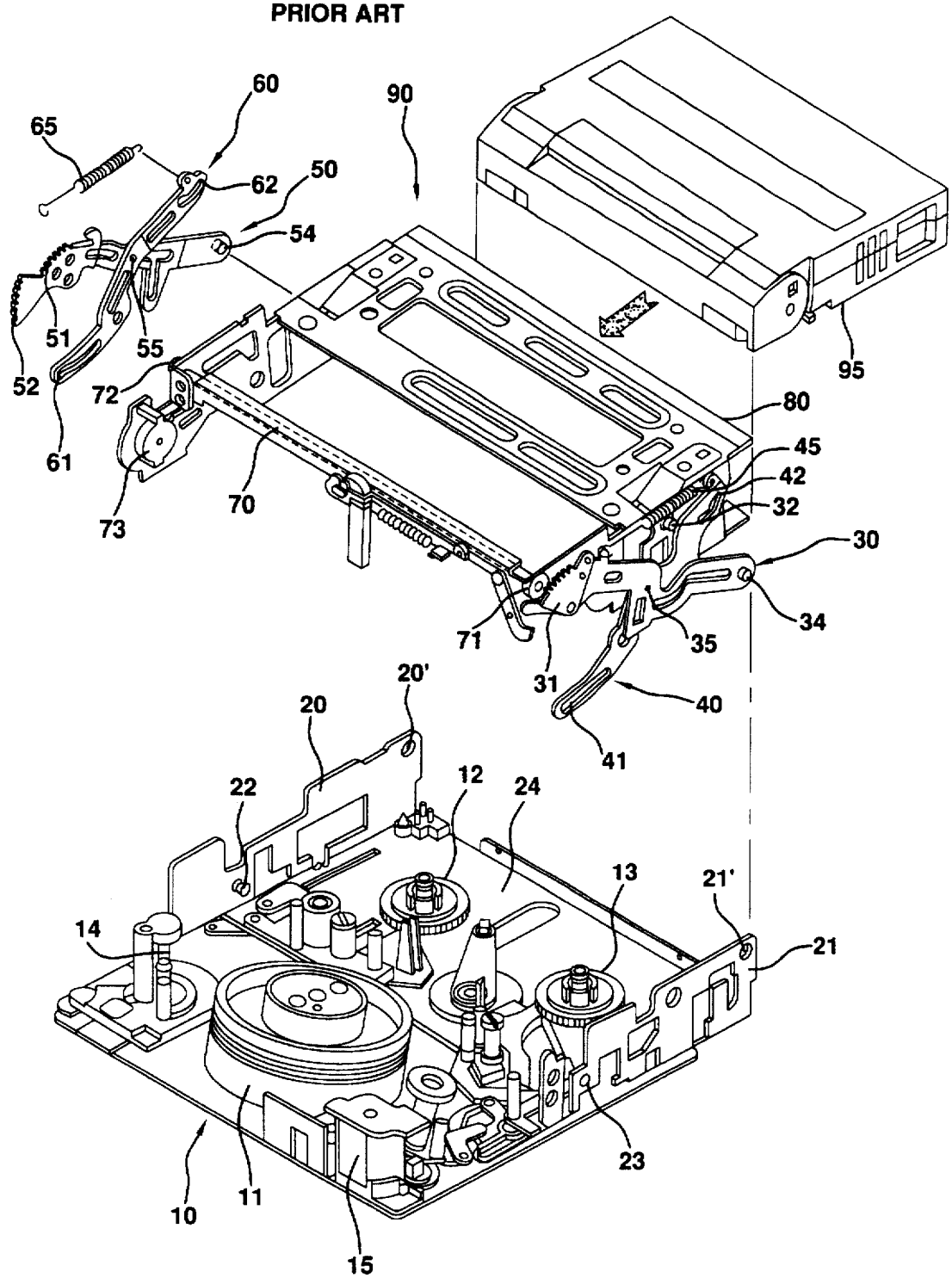
FIG. 1 is an exploded perspective view of the deck of a conventional magnetic recording/reproducing apparatus used in a camcorder.
Figure 2:
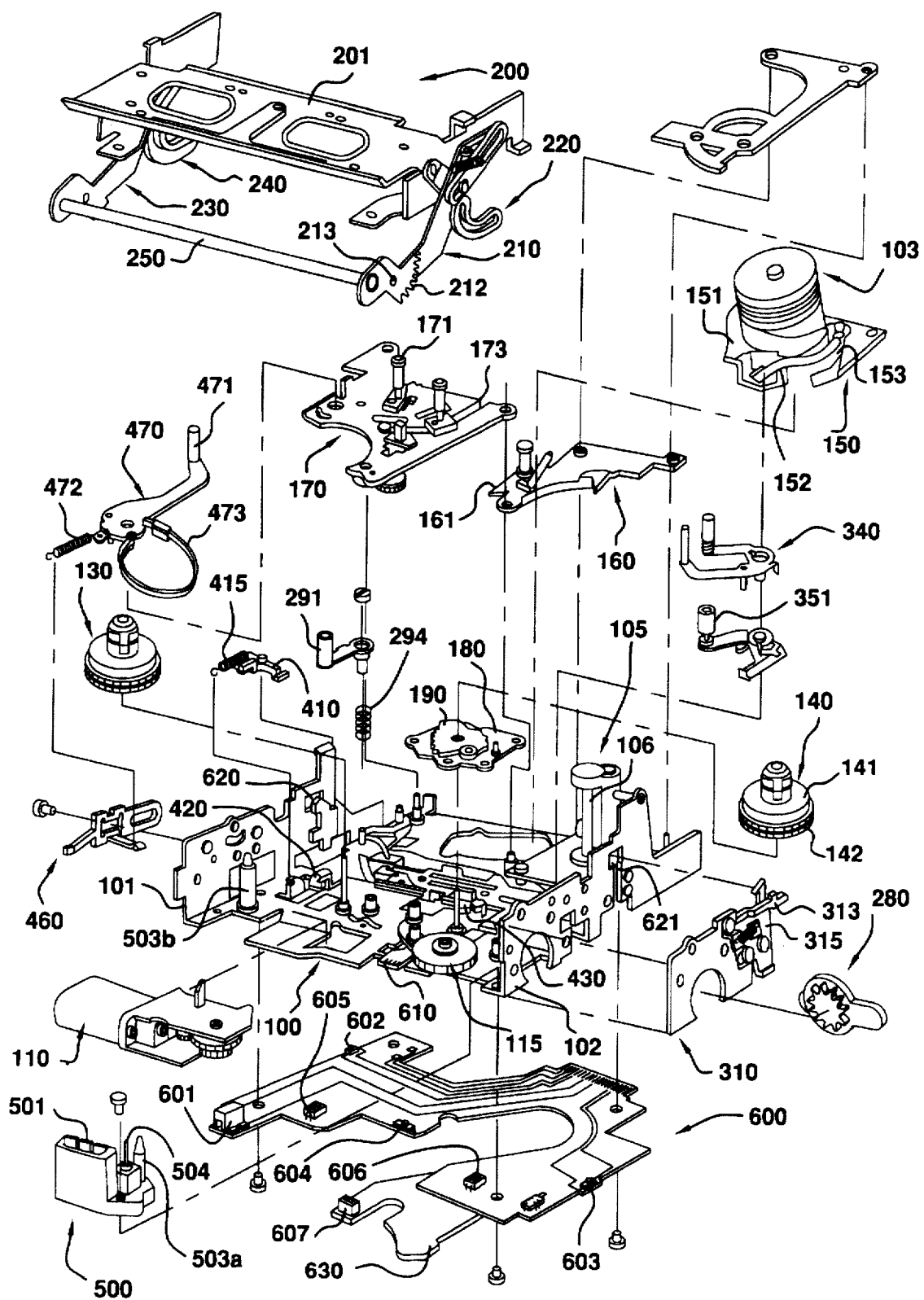
FIG. 2 is an exploded perspective view of a magnetic recording/reproducing apparatus according to the present invention.
Figure 3:
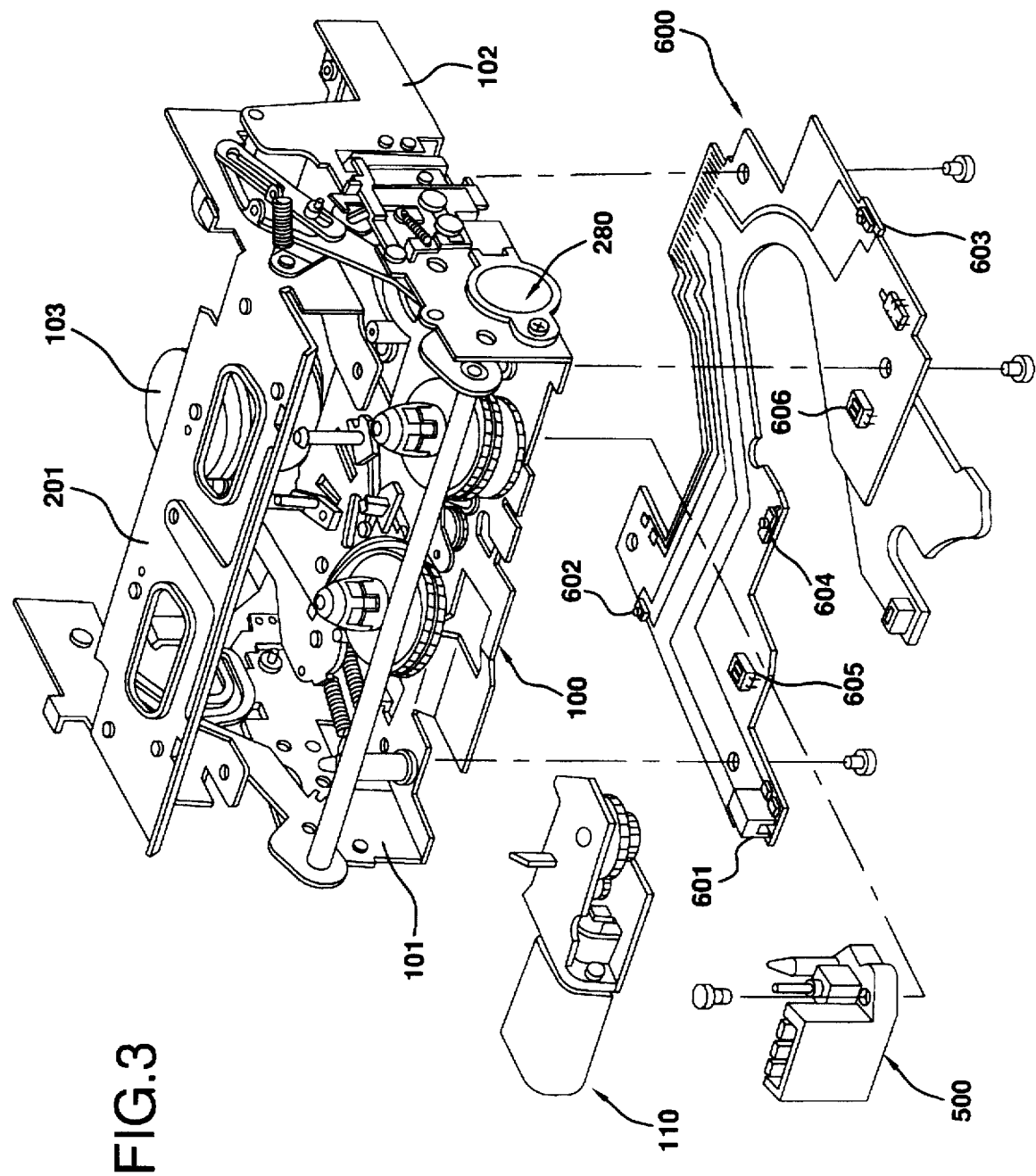
FIG. 3 is a partially assembled perspective view of the magnetic recording/reproducing apparatus of FIG. 2.

FIGS. 2 and 3 are exploded and assembled perspective views, respectively, of a magnetic recording/reproducing apparatus according to the present invention, which can be applied to a small digital camcorder.

A supply reel table 130 and a take-up reel table 140 for placement of a tape cassette 300 thereon are rotatably installed on a main deck 100 having sidewalls 101 and 102.

Figure 4:
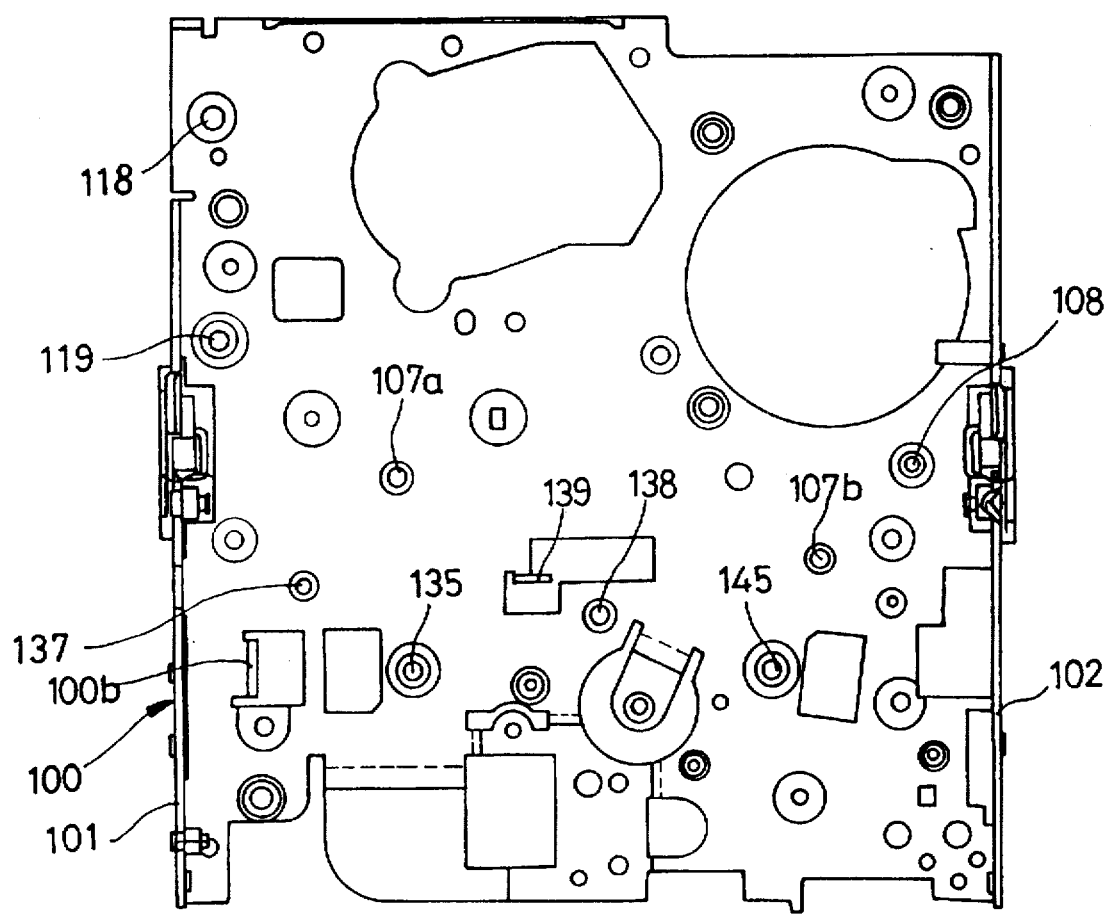
FIG. 4 is a plan view of a main deck of the magnetic recording/reproducing apparatus of FIG. 2.
Figure 5:
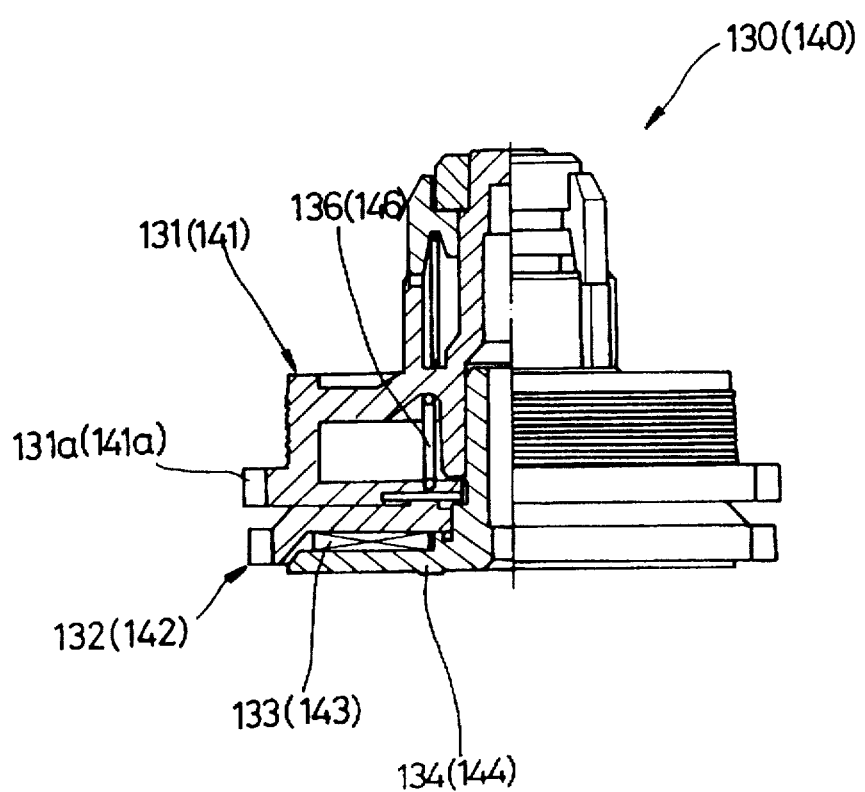
FIG. 5 is a sectional view of a reel table of the magnetic recording/reproducing apparatus of FIG. 2.

FIG. 4 is a plan view of the main deck 100, and FIG. 5 is a sectional view of the supply reel table 130 (take-up reel table 140). Referring to FIGS. 3–5, the supply reel table 130 and the take-up reel table 140 are rotatably installed on reel shafts 135 and 145 mounted on the main deck 100, respectively. The supply reel table 130 (take-up reel table 140) is provided with a reel base 134 (144) rotatably combined with the reel shaft 135 (145), a reel disk 131 (141) having a gear portion 131a (141a) formed on the outer surface thereof and combined with the reel base 134 (144) to place the tape cassette 300 thereon, a reel gear 132 (142) loosely combined with the reel disk 131 (141) and the reel base 134 (144) therebetween, a felt member 133 (143) between the reel gear 132 (142) and the reel base 134 (144), and a spring member 136 (146) for elastically biasing the reel gear 132 (142) toward the reel base 134 (144).

A capstan motor 105 is installed in the upper right portion of the main deck 100 and a capstan motor shaft 106 protrudes upward from the main deck 100. A head drum 103 having a magnetic head mounted thereon is installed in the mid-upper portion of the main deck 100, and a loading motor 110 is installed in the lower part of the main deck 100.

Figure 6:
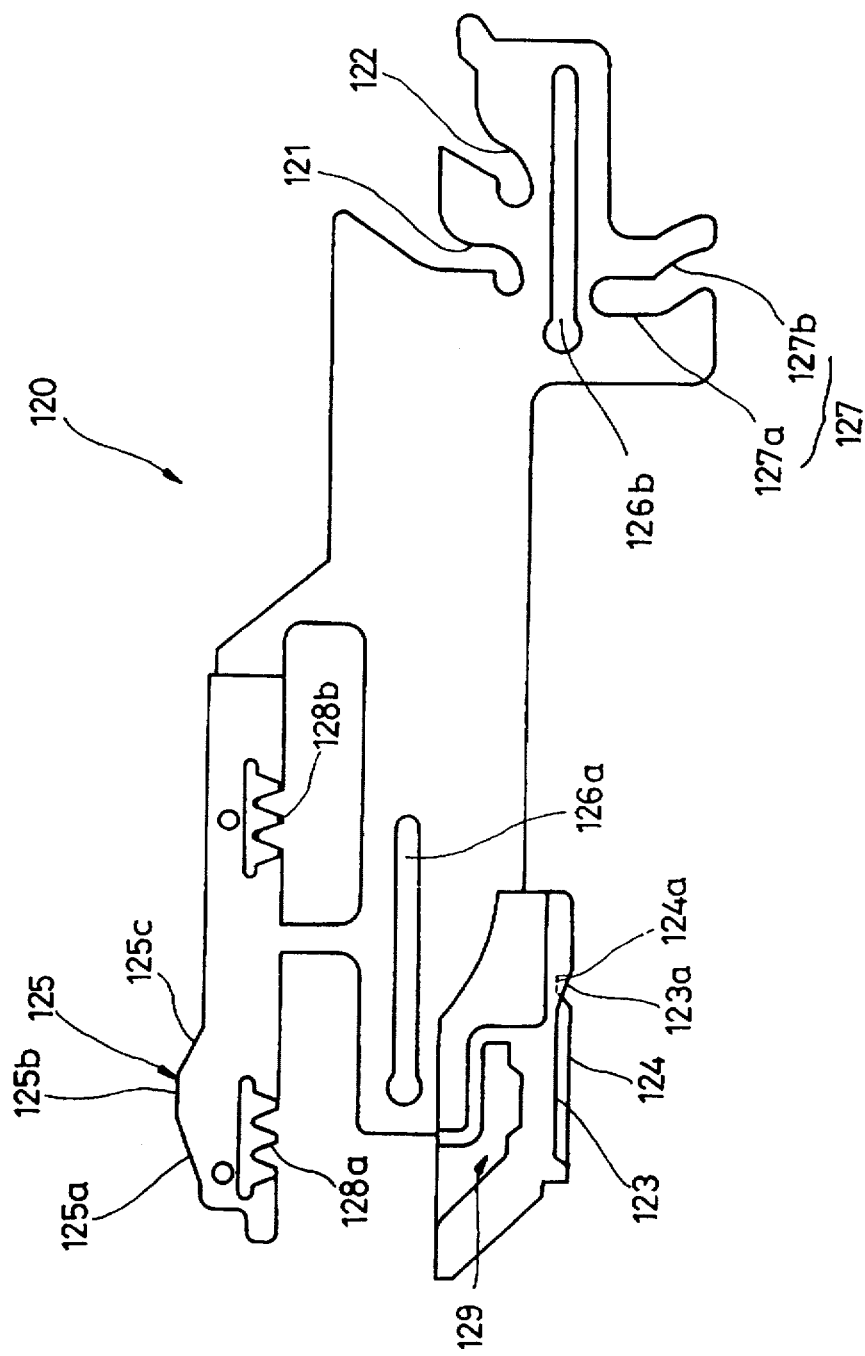
FIG. 6 is a plan view of a main slide member of the magnetic recording/reproducing apparatus of FIG. 2.
Figure 7A:
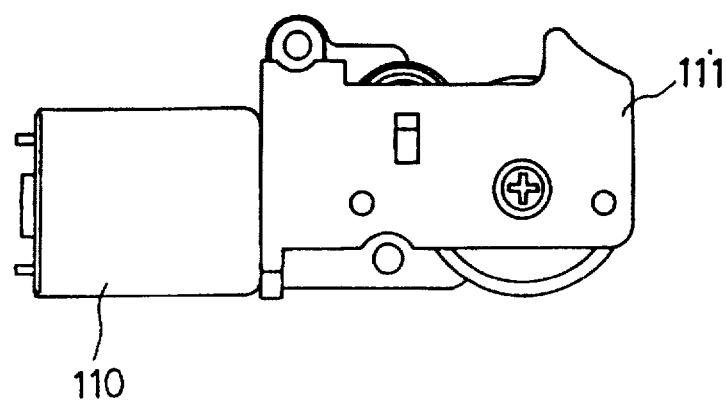
FIGS. 7A and 7B are a plan view and a side sectional view, respectively, of a loading motor in the magnetic recording/reproducing apparatus of FIG. 2.
Figure 7B:
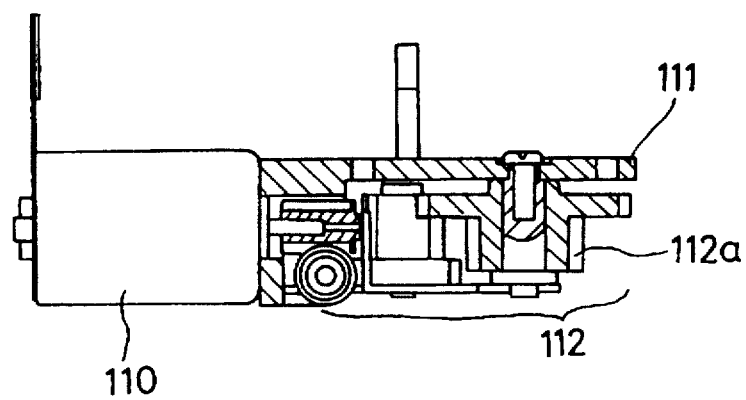

FIG. 6 is a plan view of a main slide member 120. Referring to FIGS. 4 and 6, the main slide member 120 is installed in the center of the main deck 100 to slide by the power of the loading motor 110. The main slide member 120 has guide slots 126a and 126b slidably combined with guide pins 107a and 107b formed in the main deck 100, respectively. A cam slot 127 is formed in an end portion of the main slide member 120 and has a straight portion 127a and a slanted portion 127b.

Referring to FIGS. 7–10, a support plate 111 is fixed to the loading motor 110. A gear train 112 having a plurality of linked gears is installed beneath the support plate 111. A mode gear 115 having a mode switch is coupled to a final gear 112a of the gear train 112 and a cam gear 190 having an interlocking protrusion 191 to be combined with the cam slot 127. The cam gear 190 is rotatably combined with the reel shaft 145. Therefore, when the cam gear 190 is rotated by the power of the loading motor 110, the main slide member 120 moves left and right.

The cam gear 190 is rotatably installed on the lower surface of an auxiliary plate 180, which is combined with the reel shaft 145 and fixed over the main deck 100 by a predetermined distance. The cam gear 190 has a gear portion 192 to be engaged with the mode gear 115 and a cam having a predetermined shape for interlocking a reel brake member and a housing release lever to be described later.

Referring to FIGS. 2 and 12–15, a holder assembly 200 having a holder 201 for accommodating the tape cassette 300 is supported at both sidewalls 101 and 102 of the main deck 100 so that the holder assembly 200 can move up and down.

The holder assembly 200 is provided with the holder 201 having guide pins 201a and 201b at both sides, for accommodating the tape cassette 300, first and second arm members 210 and 220 and a first interlocking member 260 which are rotatably combined at one side of the holder 201, and third and fourth arm members 230 and 240 and a second interlocking member 270 which are rotatably combined at the other side of the holder 201.

The second arm member 220 has a second slot 221, and a fixing pin 222 in the middle thereof, and the fourth arm member 240 has a fourth slot 241, and a fixing pin 242 in the center thereof. The second and fourth arm members 220 and 240 are slidable with respect to the respective sides of the holder 201 by the second and fourth slots 221 and 241, respectively.

The first and third arm members 210 and 230 are rotatably combined with the fixing pins 222 and 242, respectively. Portions of the first and third arm members 210 and 230 have first and third guide slots 211 and 231 to be slidably combined with the guide pins 201a and 201b, respectively. The other portions thereof are connected by a linking shaft 250, and have respective center-of-rotation holes 213 and 233 in their rotational centers, to be rotatably combined with both sidewalls 101 and 102 of the main deck 100.

Portions of the first and second interlocking levers 260 and 270 are movably combined with the fixing pins 222 and 242, respectively, and the other portions thereof have engaging slots 261 and 271 to be slidably combined with the guide pins 201a and 201b, respectively.

The second arm member 220 is coupled to the first interlocking lever 260 by the first spring member 202, and the fourth arm member 240 is coupled to the second interlocking lever 270 by the second spring member 203.

Figure 13:
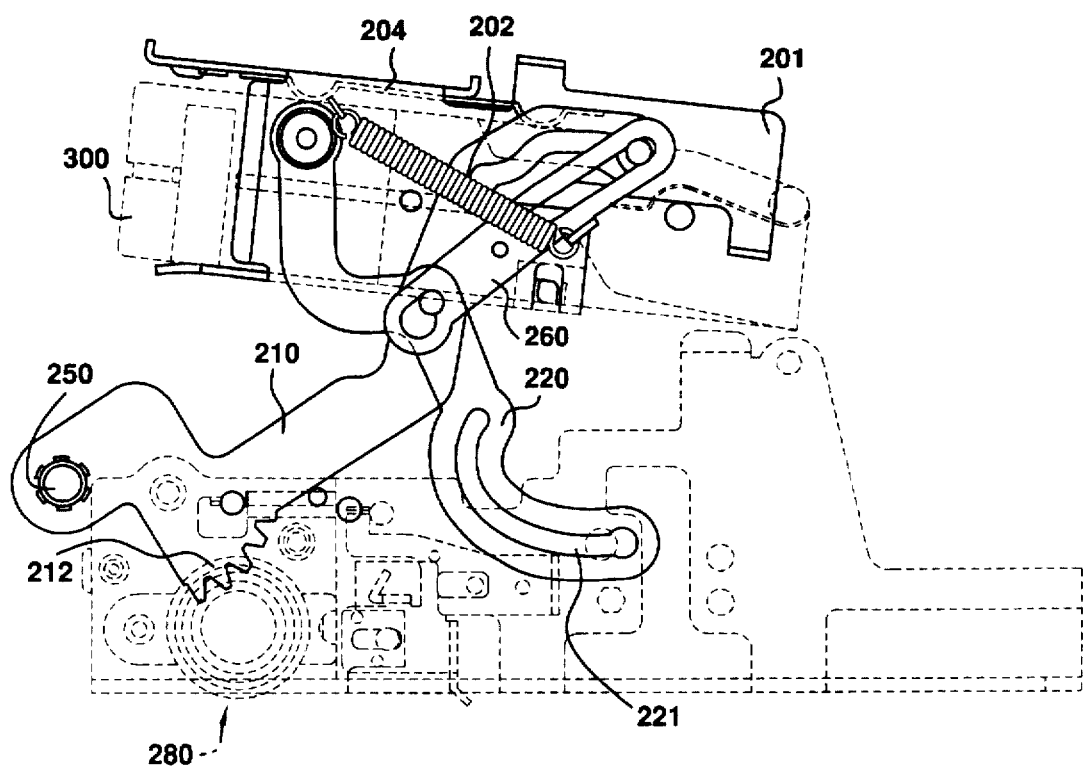
FIG. 13 is a side view of the holder assembly shown in FIG. 12.
Figure 14:
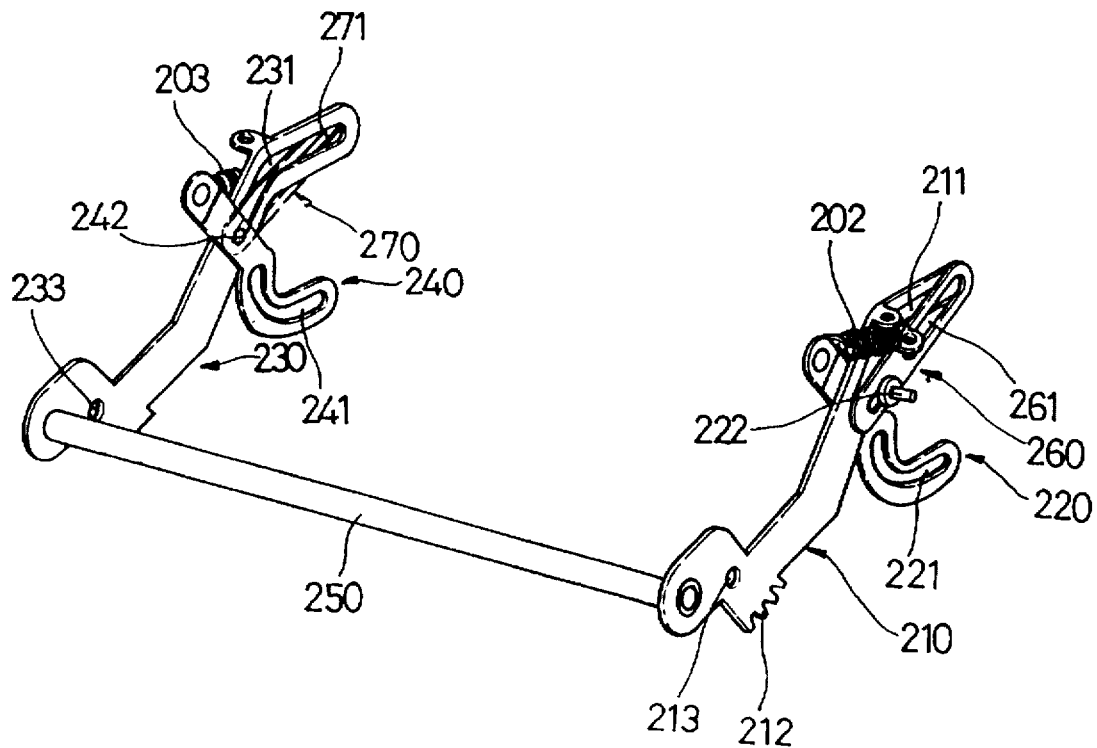
FIG. 14 is a perspective view of an extracted portion of the holder assembly shown in FIG. 12.
Figure 16:
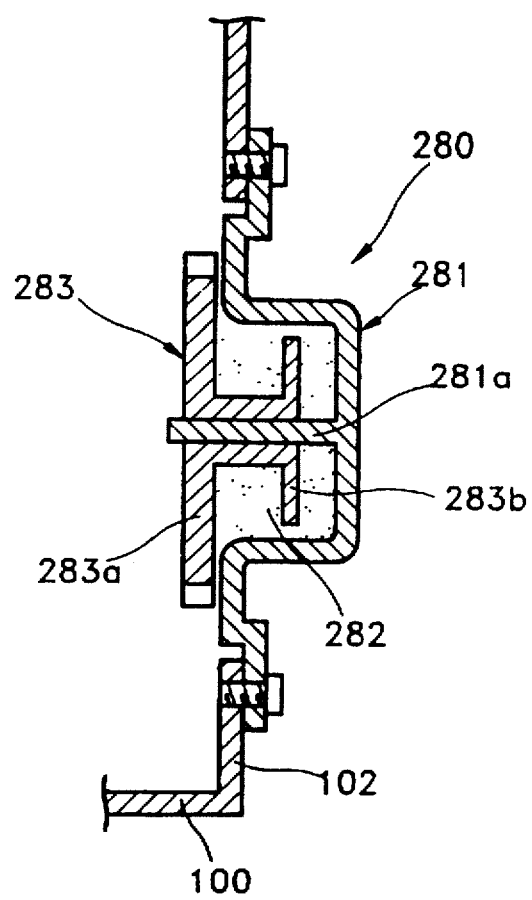
FIG. 16 is a schematic sectional view of a damping unit of the magnetic recording/reproducing apparatus of FIG. 2.

Referring to FIGS. 13 and 16, damping means is provided to buffer the restoring force of the first and second spring members 202 and 203 when the holder assembly 200 moves up and down. This damping means includes a sector gear 212 formed in the first arm member 210 and a damping unit 280 installed on the sidewall 102 of the main deck 100 to be interlocked with the sector gear 212.

The damping unit 280 is comprised of a cover member 281 and a gear unit 283. The cover member 281 has a fixed, cantilever shaft 281a and a containing portion for containing a damping material 282 of a predetermined viscosity. The gear unit 283 has a frictional disk 283b rotatably combined with the shaft 281a, for rotating in friction with the damping material 282, and a damping gear 283a to be engaged with the sector gear 212. In fact, the damping unit 280 is fixed to a fixing plate 310 to be described later and then installed on the sidewall 102.

Figure 12:
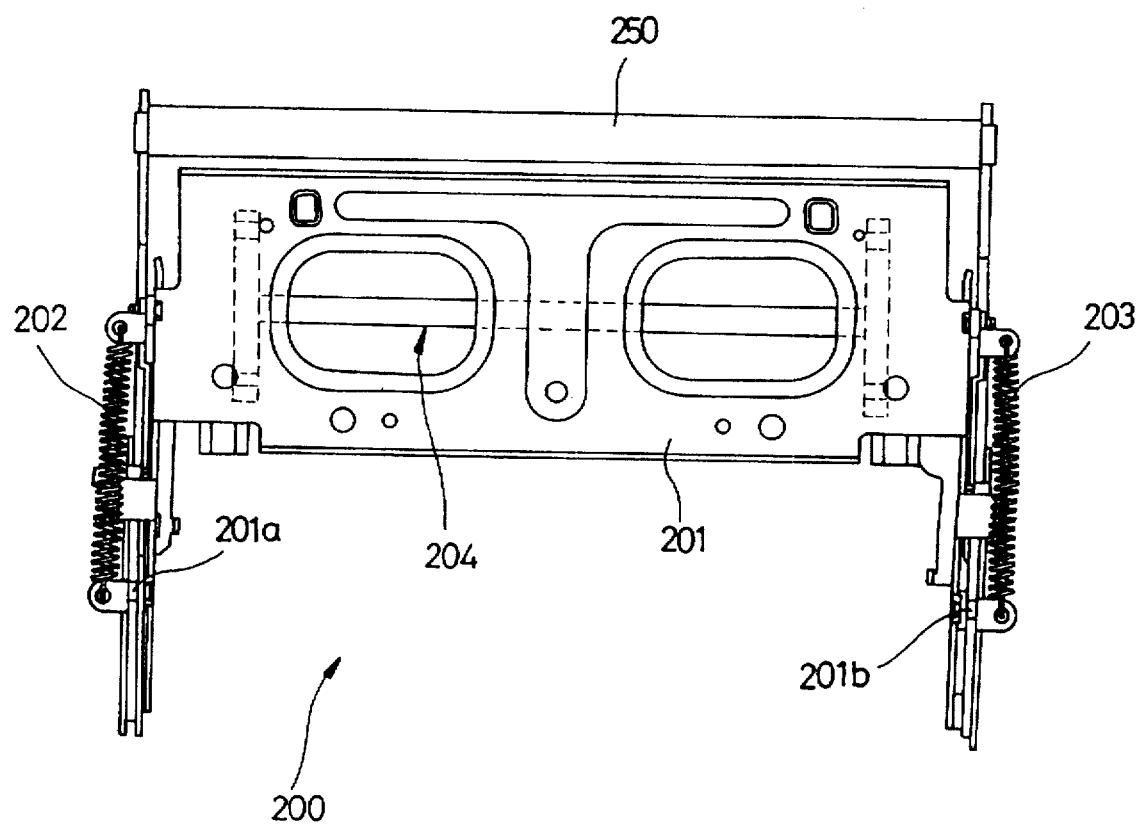
FIG. 12 is a plan view of a holder assembly of the magnetic recording/reproducing apparatus of FIG. 2.
Figure 15:
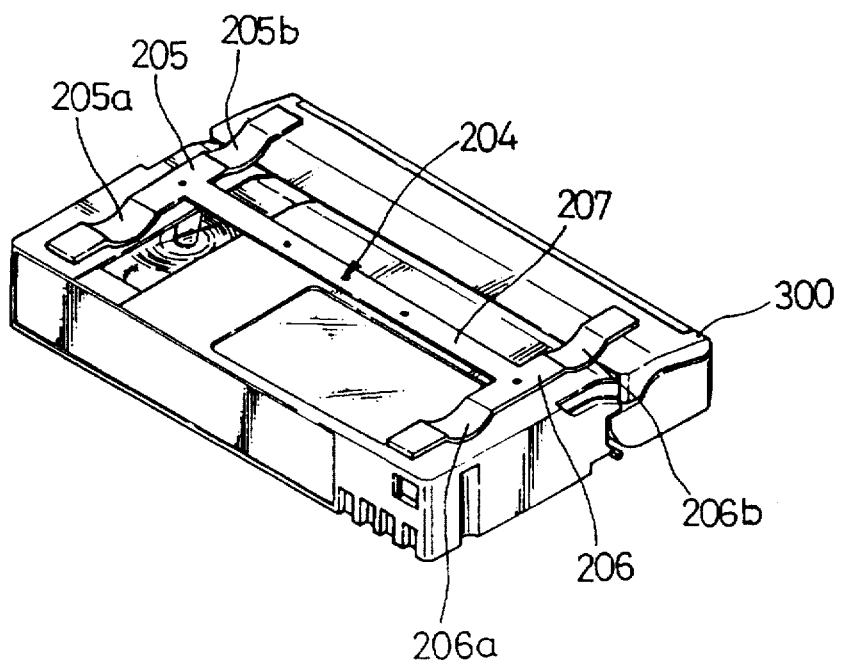
FIG. 15 is a schematic view of a tape cassette and the pressing plate spring member of the magnetic recording/reproducing apparatus of FIG. 2.

Referring to FIGS. 12 and 15, a plate spring 204 is attached to the holder 201 to press certain frontal and rear points along both sides on the upper surface of the tape cassette 300.

The spring member 204 has a transverse portion 207 fixed to the holder 201, and first and second extension portions 205 and 206 extended orthogonally from both ends of the transverse portion 207 along both sides of the holder 201 and having curvatures 205a and 205b, and 206a and 206b to be in contact with the upper surface of the tape cassette 300.

Figure 17:
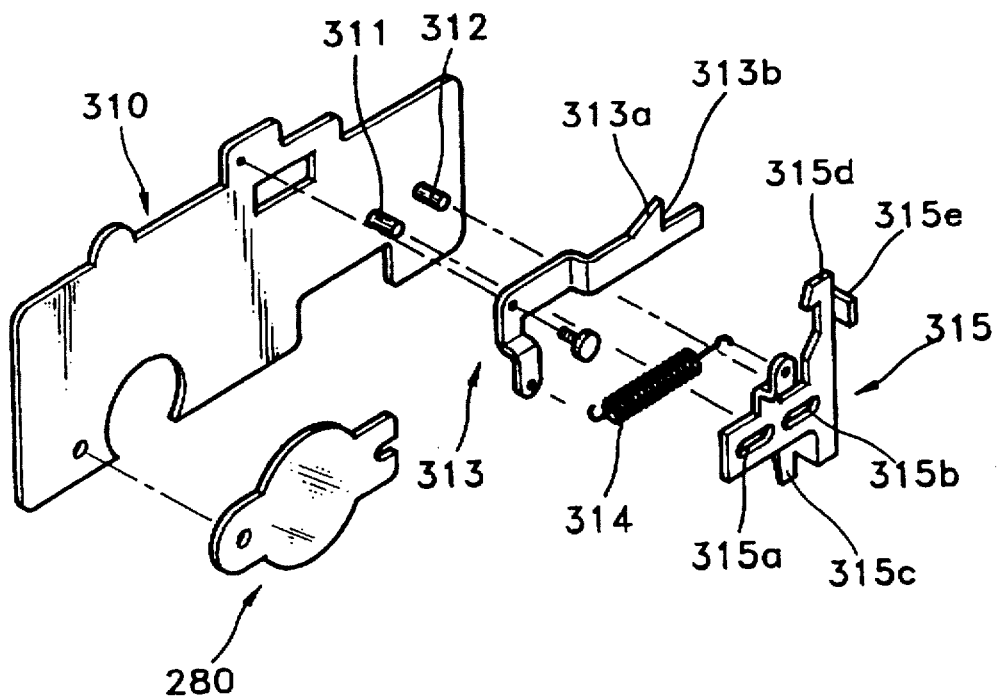
FIG. 17 is an exploded perspective view of lock releasing means of a holder of the magnetic recording/reproducing apparatus of FIG. 2.
Figure 18:
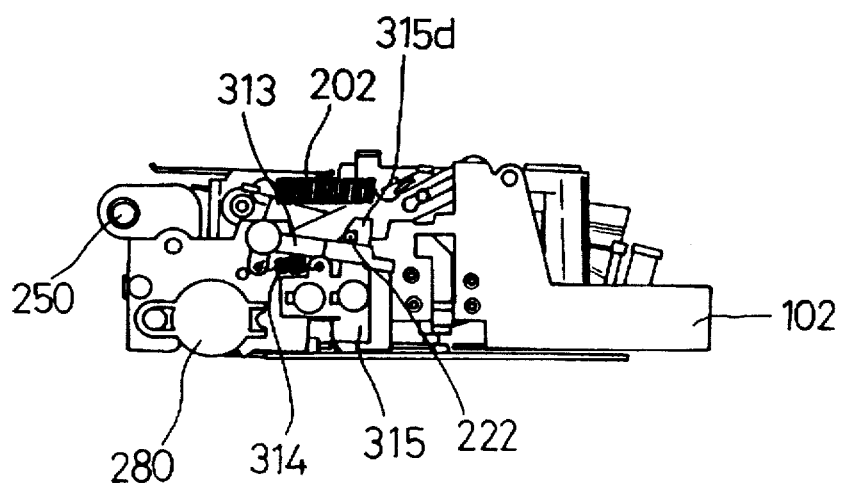
FIG. 18 is a side view of a locked holder of the magnetic recording/reproducing apparatus of FIG. 2.

Referring to FIGS. 2, 17 and 18, locking means is provided on the sidewall 102 of the main deck 100 to fix the holder assembly 200 in a predetermined position.

The locking means has a fixing plate 310 fixed to the sidewall 102 of the main deck 100 and includes a plurality of guide pins 311 and 312, an operational member 313 rotatably combined with the fixing plate 310, and a locking member 315 slidably combined with the fixing plate 310.

The operational member 313 has an inclined surface 313a inclined at a predetermined angle on an upper surface thereof and a vertical surface 313b vertically extending from the inclined surface 313a. The locking member 315 has guide slots 315a and 315b to be slidably combined with the guide pins 311 and 312, an interlocking piece 315e to slidably contact the inclined surface 313a and the vertical surface 313b, and a locking piece 315d for locking the fixing pin 222 formed in the second arm member 220 of the holder assembly 200. The operational member 313 is coupled to the locking member 315 by a spring member 314.

When the holder 201 descends and the fixing pin 222 presses against the locking piece 315d, the locking member 315 moves and the fixing pin 222 descends. At the same time, the locking member 315 is restored to its former position, and the locking piece 315d is locked in the fixing pin 222.

Lock releasing means is provided to move the locking member 315 and thus release the fixing pin 222 from the locking piece 315d.

Figure 9:
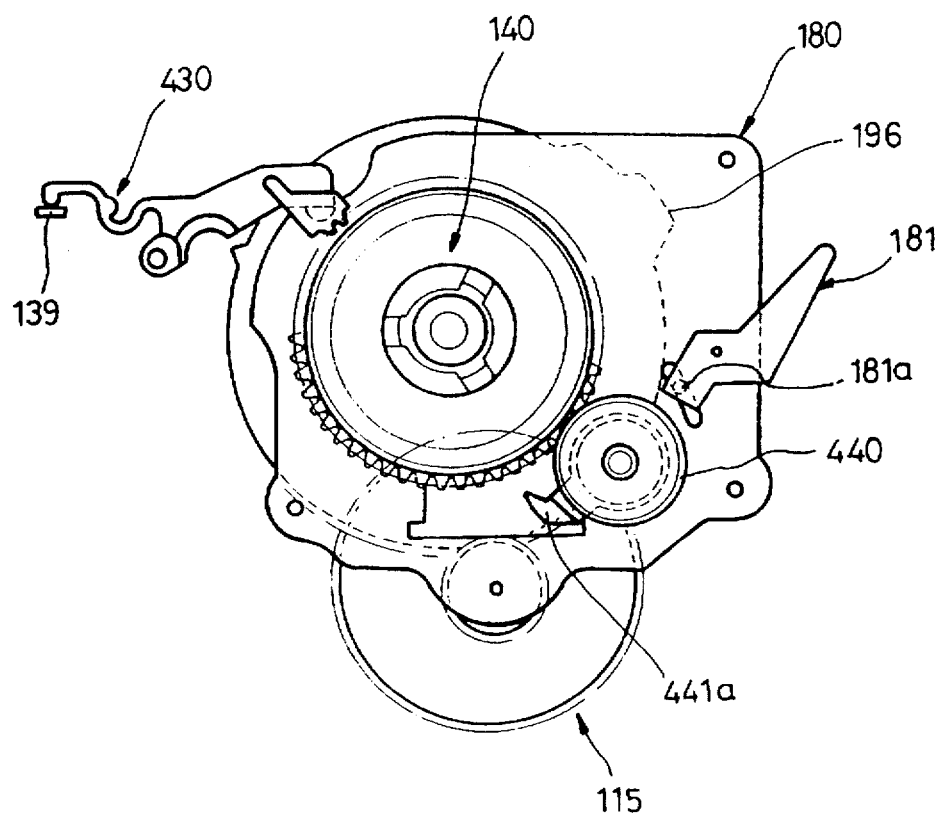
FIG. 9 is a plan view of an important portion of a take-up reel table of the magnetic recording/reproducing apparatus of FIG. 2.
Figure 10:
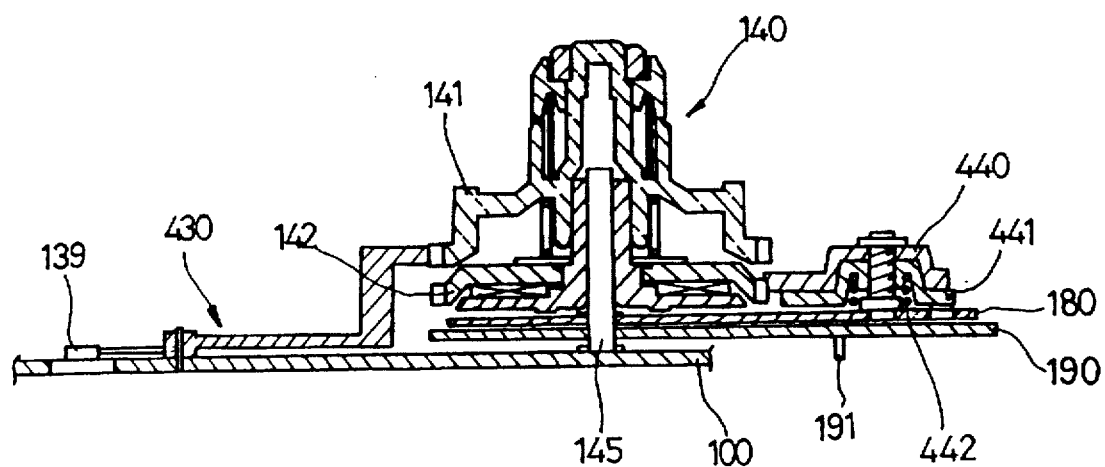
FIG. 10 is a schematic sectional view of the take-up reel table shown in FIG. 9.
Figure 11:
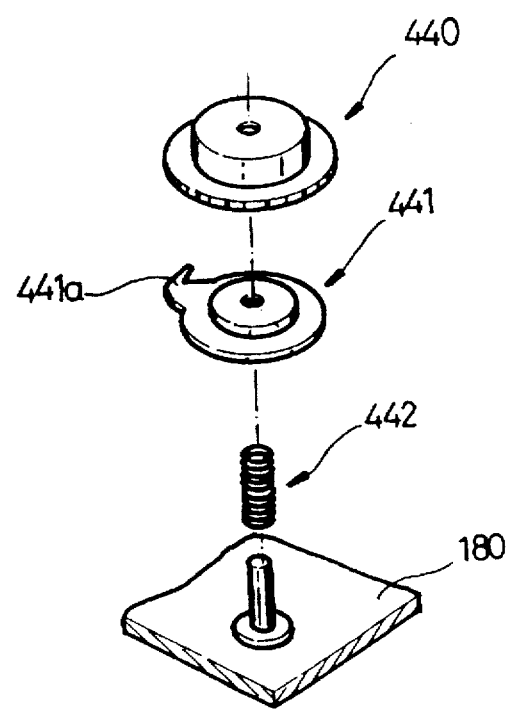
FIG. 11 is an exploded perspective view of an extracted important portion of the take-up reel table shown in FIG. 10.

Referring to FIGS. 9 and 17, the lock releasing means includes a release piece 315c extending from the locking member 315, a release lever 181 rotatably installed on the auxiliary plate 180 and having an interlocking protrusion 181a formed on the lower surface thereof, and a locking release protrusion 196 formed on the outer surface of the cam gear 190, for interlocking the interlocking protrusion 181a. This lock releasing means operates so that the lock releasing protrusion 196 of the rotating cam gear 190 interlocks with the interlocking protrusion 181a in an eject mode, and the end portion of the rotating lock releasing lever 181 is brought into contact with the release piece 315c to move the locking member 315.

Tape loading means is constituted by the following, to load a tape from the tape cassette 300 stably placed on the reel tables 130 and 140 toward the head drum 103.

Figure 19:
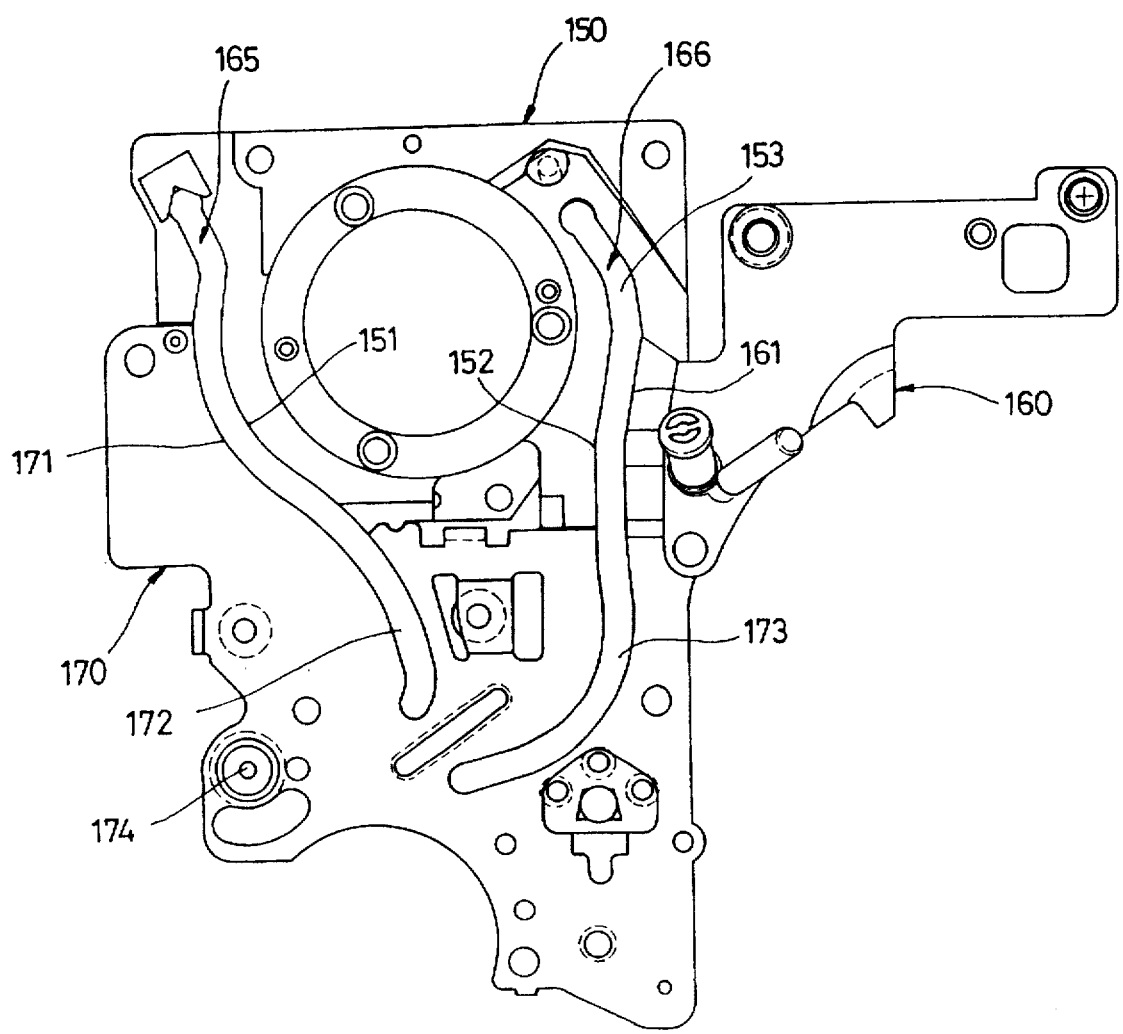
FIG. 19 is a plan view of guide portions of first and second pole bases of the magnetic recording/reproducing apparatus of FIG. 2.
Figure 20A:
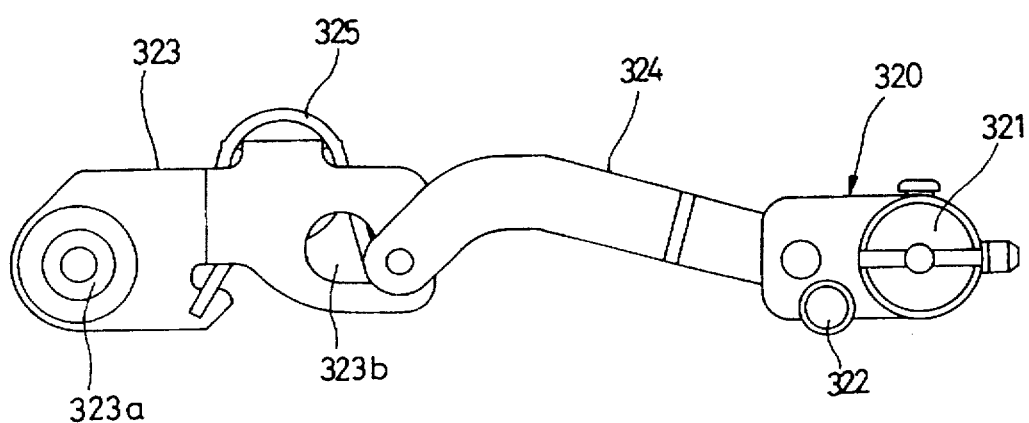
FIGS. 20A and 20B are a plan view and a side view, respectively, of a first pole base of the magnetic recording/reproducing apparatus of FIG. 2.
Figure 20B:
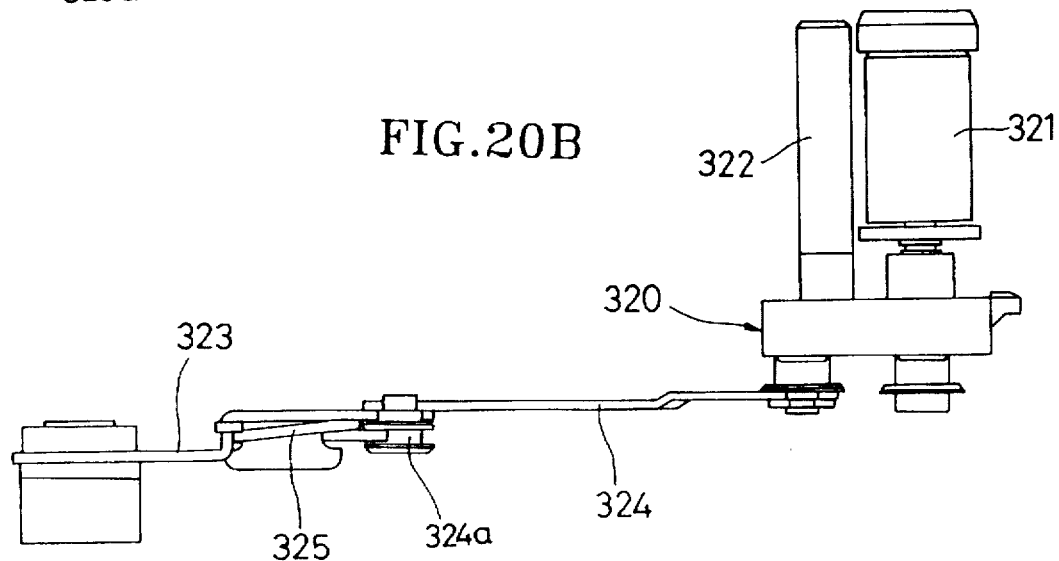
Figure 21A:
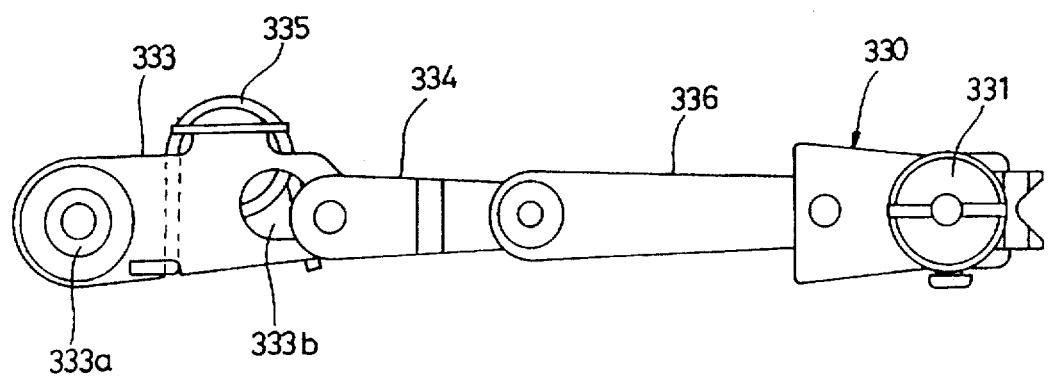
FIGS. 21A and 21B are a plan view and a side view, respectively, of a second pole base of the magnetic recording/reproducing apparatus of FIG. 2.
Figure 21B:
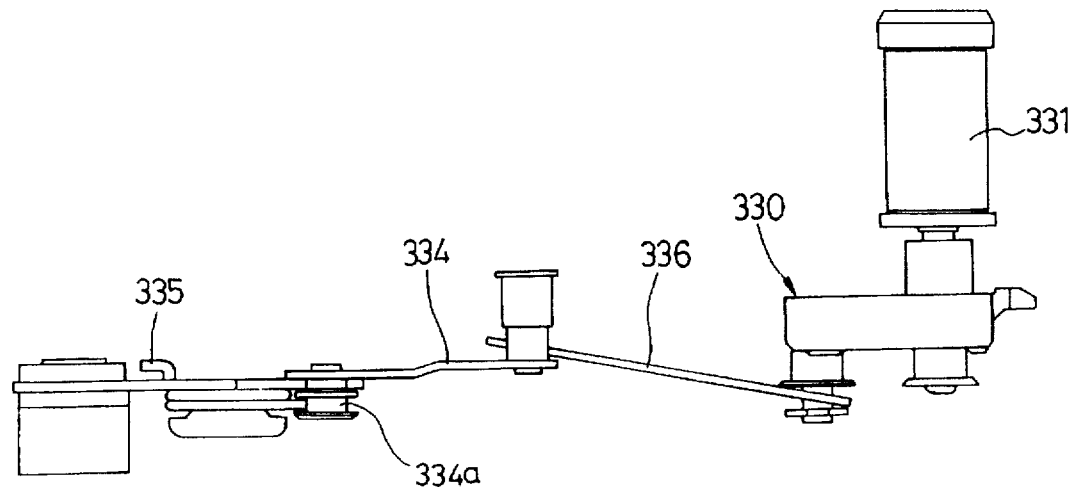

Referring to FIGS. 2 and 19, first, second and third plates 150, 160 and 170 are fixed over the main deck 100 by predetermined distances.

The first plate 150 supports the head drum 103, and includes a first guide surface 151 in one portion thereof and a guide opening 153 having a second guide surface 152 in the other portion thereof. A third guide surface 161 facing the second guide surface 152 is formed on the second plate 160. The third plate 170 has a first guide rail 172 having a fourth guide surface 171 facing the first guide surface 151, and a second guide rail 173 to be connected to the guide opening 153 and the third guide surface 161. Therefore, when the first, second and third plates 150, 160 and 170 are assembled, first and second guide slots 165 and 166 are formed, as shown in FIG. 19. The second and third guide surfaces 152 and 161 are inclined toward the rear end portion of the main deck 100.

Referring to FIGS. 2 and 19–21B, a first pole base 320 having guide poles 321 and 322 for guiding the tape is slidably formed in the first guide slot 165, and a second pole base 330 having a guide pole 331 for guiding the tape is slidably formed in the second guide slot 166. First and second loading arms 323 and 333 having first and second loading gears 323a and 333a formed in their respective ends are rotatably installed on the lower surface of the third plate 170. The first loading arm 323 is connected to the first pole base 320 by a first link member 324, and the second loading arm 333 is connected to the second pole base 330 by second and third link members 334 and 336.

The first loading arm 323 has a first engaging hole 323b for engaging with a pin 324a of the first link member 324, and a torsion spring 325 of which one end is supported by the pin 324a and the other end is supported by the first loading arm 323. The second loading arm 333 has a second engaging hole 333b for engaging with a pin 334a of the second link member 334, and a torsion spring 335 of which one end is supported by the pin 334a and the other end is supported by the second loading arm 333.

As shown in FIG. 6, first and second rack gear portions 128a and 128b for engaging with the first and second loading gears 323a and 333a are formed in the main slide member 120. Thus, when the main slide member 120 moves in a predetermined direction, the first and second loading gears 323a and 333a rotate and the first and second pole bases 320 and 330 move along the first and second guide slots 165 and 166.

Figure 22:
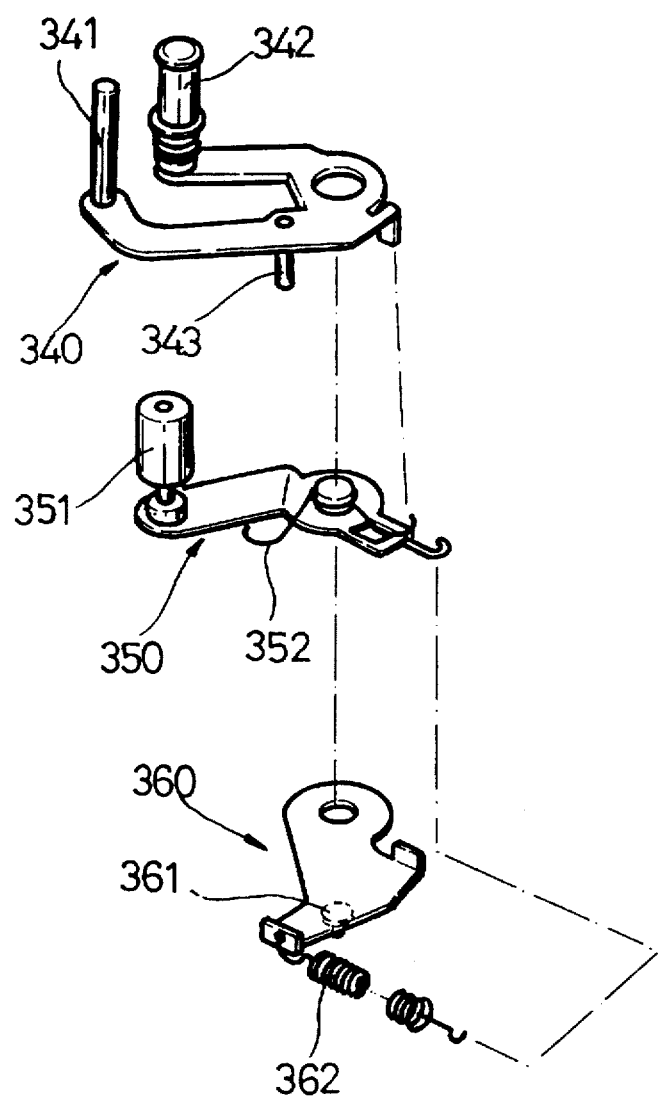
FIG. 22 is a perspective view of an extracted portion of a pinch roller of the magnetic recording/reproducing apparatus of FIG. 2.

Referring to FIGS. 2, 6 and 22, tape transferring means is provided for interlocking with the main slide member 120 to transfer the tape while pressing the tape against the capstan motor shaft 106.

In the tape transferring means, a first cam guide opening 121 and a second cam guide opening 122 are formed in the main slide member 120. As shown in FIG. 4, a fixing shaft 108 is installed on the main deck 100. A review arm 340, a pinch arm 350 and an interlocking arm 360 are rotatably combined with the fixing shaft 108, in sequence.

A pinch roller 351 to press against the capstan motor shaft 106 is installed on the pinch arm 350. A first cam protrusion 343 is formed on the bottom of the review arm 340 to be slidably combined with the first cam guide opening 121. First and second guide poles 341 and 342 for guiding the tape before and behind the capstan motor shaft 106 are formed on the upper surface of the review arm 340. A second cam protrusion 361 is formed on the bottom of the interlocking arm 360 to be slidably combined with the second cam guide opening 122.

One end of the interlocking arm 360 is coupled to the pinch arm 350 by a spring member 362. A torsion spring 352 is provided between the pinch arm 350 and the review arm 340 such that one end of the torsion spring 352 is supported by the other end of the interlocking arm 360 and the other end of the torsion spring 352 is supported by the first cam protrusion 343.

The above tape transferring means operates so that the first and second cam protrusions 343 and 361 are interlocked with the main slide member 120 when the main slide member 120 move right and left, the pinch arm 350 is rotated, and thus the pinch roller 351 is pressed against or detached from the capstan motor shaft 106.

Figure 23:
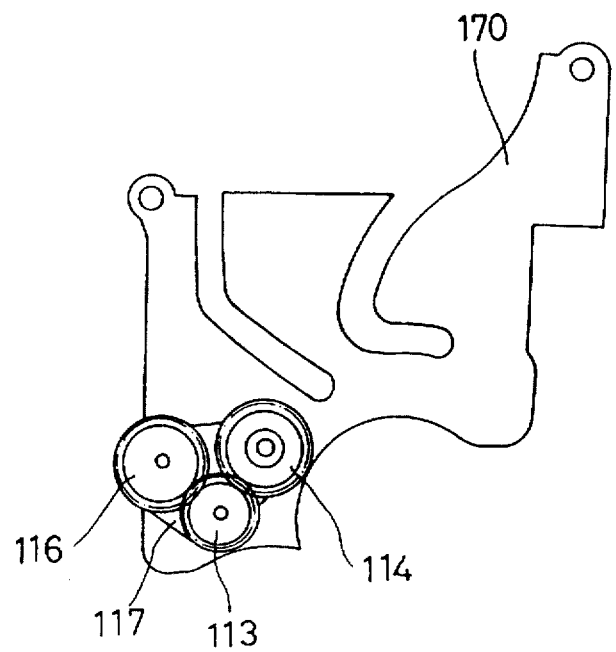
FIG. 23 is a bottom view of a third plate of the magnetic recording/reproducing apparatus of FIG. 2.
Figure 24:
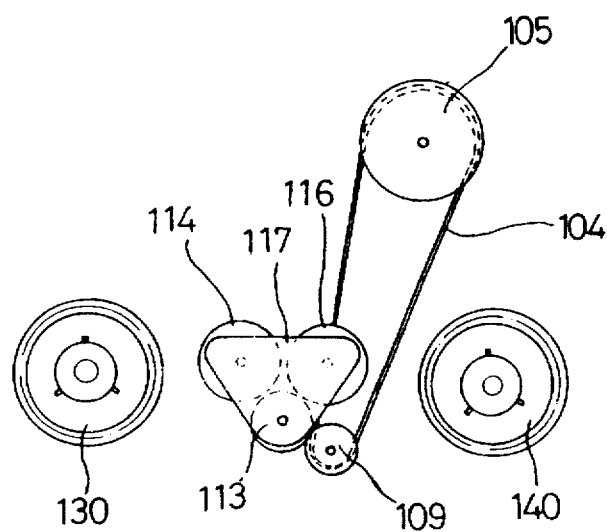
FIG. 24 is a diagram for illustrating the transfer of power in the reel table of FIG. 5.

Referring to FIGS. 23 and 24, reel driving means for selectively transmitting the power of the capstan motor 105 to the pair of reel tables 130 and 140 is constituted as follows.

A driven gear 113 is rotatably installed on the lower surface of the third plate 170 and a mobile plate 117 is installed to rotate along with the driven gear 113. First and second idlers 114 and 116 to be engaged with the driven gear 113 are installed on the mobile plate 117. A driving gear 109 is connected to the capstan motor 105 by a timing belt 104.

The reel driving means is operated such that the first idler 114 selectively engages with the reel disk 131 of the reel table 130, or the second idler 116 with the reel disk 141 of the reel table 140, according to the direction of rotation of the driven gear 113.

Referring to FIGS. 2, 6, 19, 25A, 26 and 27, tension controlling means is provided, which rotates by interlocking with the main slide member 120 and applies a predetermined tension to the travelling tape.

In the tension controlling means, a tension arm 470 is rotatably installed over the third plate 170. In FIG. 19, reference numeral 174 denotes an engaging hole with which the tension arm 470 is rotatably combined. A tension pole 471 for guiding the tape is installed on an end portion of the tension arm 470. A third cam protrusion 474 for interlocking with the main slide member 120 is formed beneath the other end portion of the tension arm 470. The tension arm 470 is elastically biased in a direction by a spring 472. The force of this spring 472 can be controlled by predetermined controlling means. The tension arm 470 has a tension band 473 to be wrapped around the reel disk 131 of the supply reel 130.

A third cam guide opening 129 with which the third cam protrusion 474 is slidably combined is formed in the main slide member 120.

The controlling means includes a slide member 460 slidably installed on the sidewall 101 and having a hook piece 462 to which one end of the spring 472 is fixed, transferring means for transferring the slide member 460, and fixing means for fixing the slide member 460 at a predetermined position on the sidewall 101. A through hole 101a through which the hook piece 462 is inserted is formed on the sidewall 101.

In the transferring means, an arc slot 101c is formed on the sidewall 101. A controlling device 480 having a controlling pin 481 slidably inserted into the arc slot 101c is rotatably installed on the sidewall 101. The controlling device 480 has a rotational shaft 482, and a screw hole 101b for screw-combining with the rotational shaft 482 is formed on the sidewall 101.

An engaging groove 461 for combining with the controlling pin 481 is formed in the slide member 460. Thus, when the controlling device 480 is rotated, the slide member 460 moves. The slide member 460 is moved to a predetermined position, where it is fixed to the sidewall 101 by a fixing screw 466. The slide member 460 and the sidewall 101 have a fixing slot 464 and a fixing hole 101d for combining with the fixing screw 466, respectively.

Figure 27:
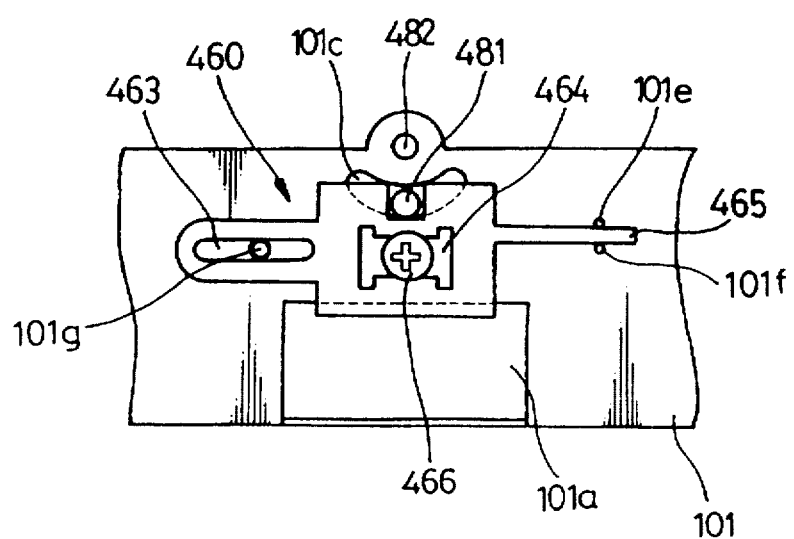
FIG. 27 is a side view of the tension controller shown in FIG. 26.
Figure 28:
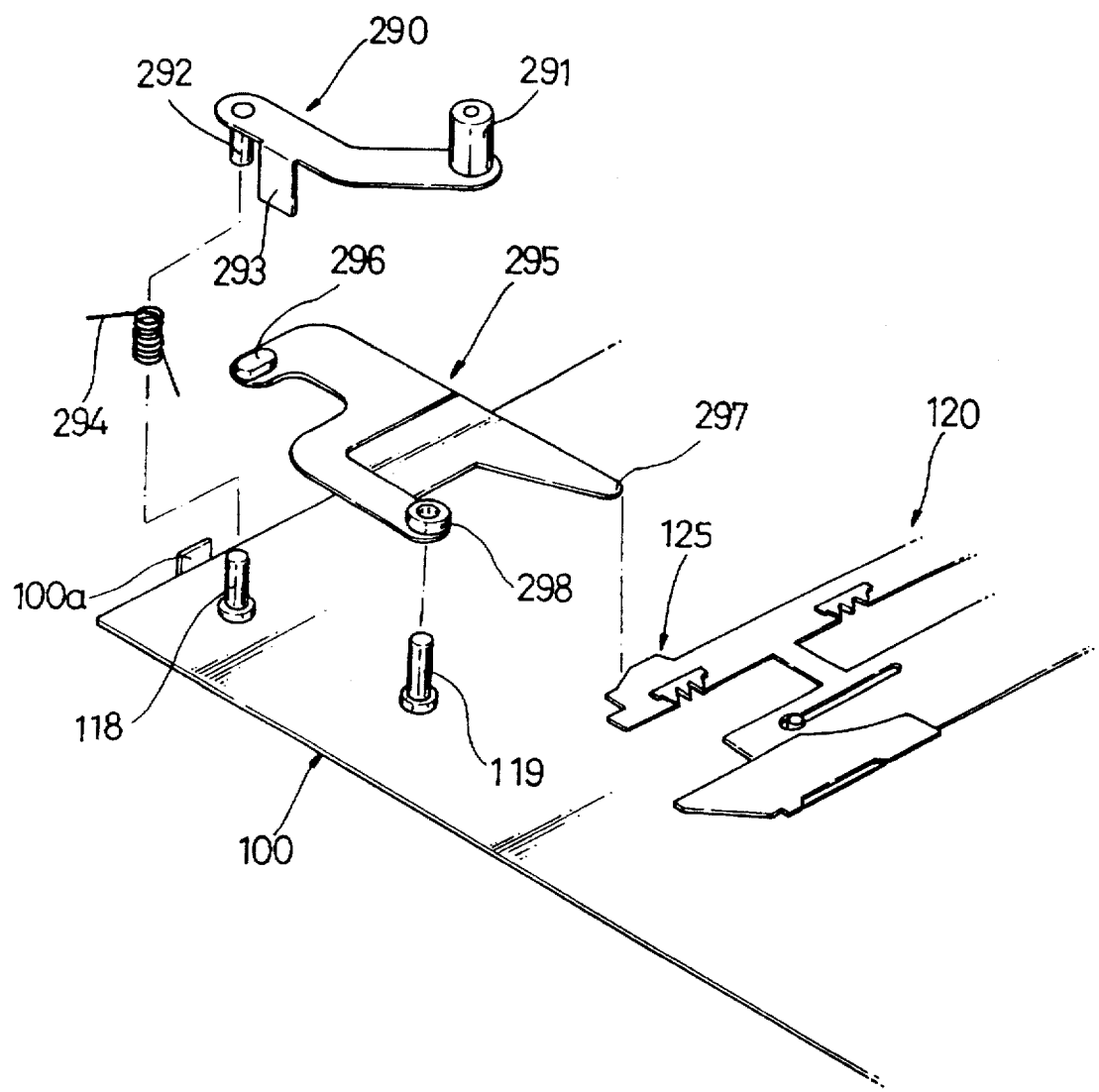
FIG. 28 is an exploded perspective view of an impedance roller in the magnetic recording/reproducing apparatus of FIG. 2.
Figure 29:
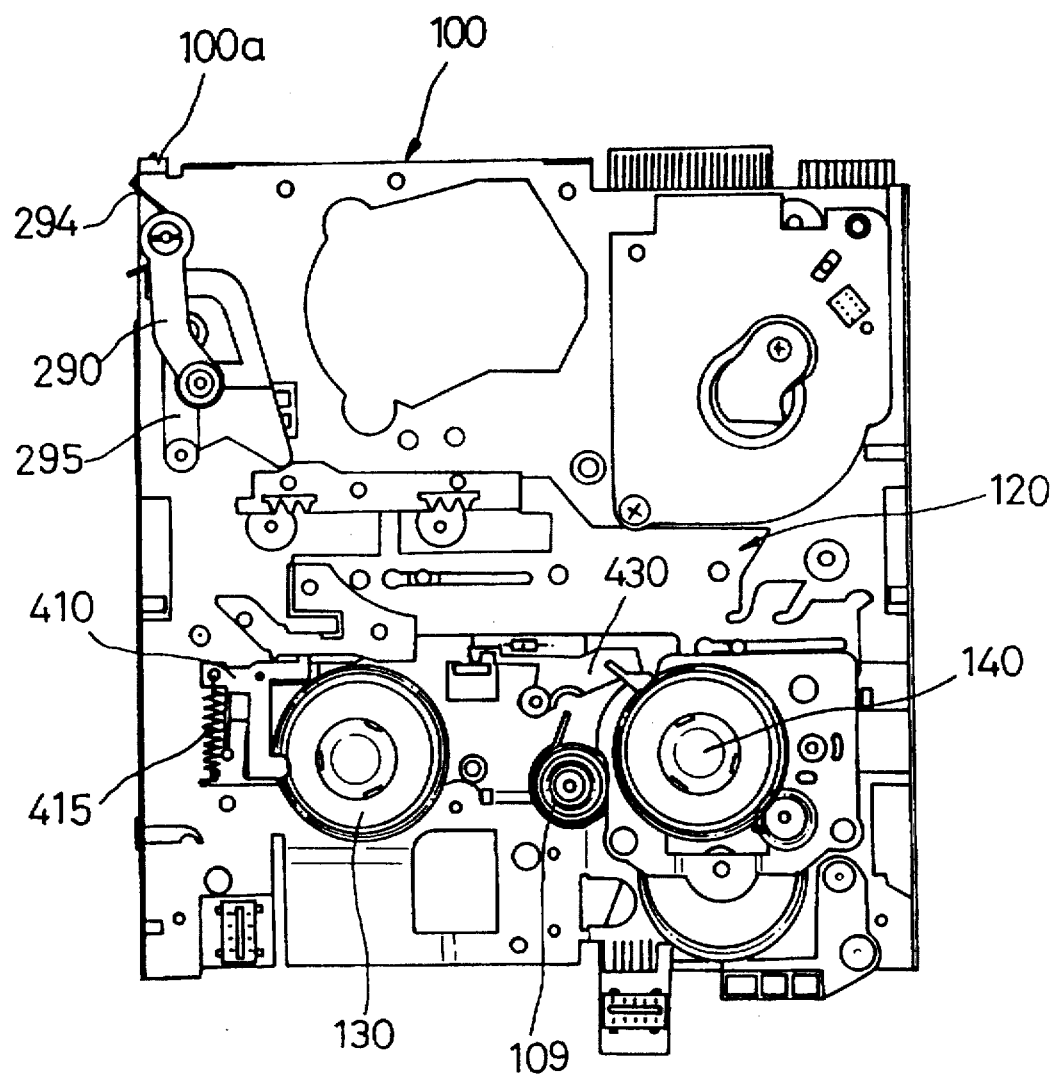
FIG. 29 is a plan view of the main deck shown in FIG. 4, in a loaded position.
Figure 30:
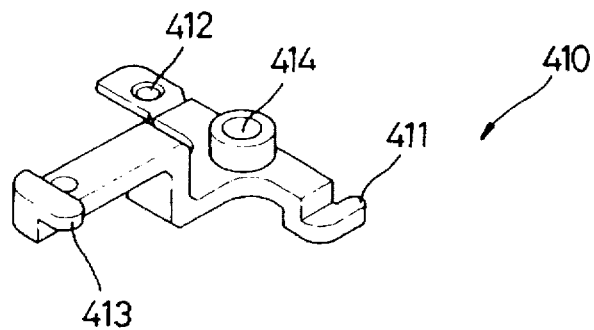
FIG. 30 is a perspective view of a first brake member of the magnetic recording/reproducing apparatus of FIG. 2.
Figure 31:
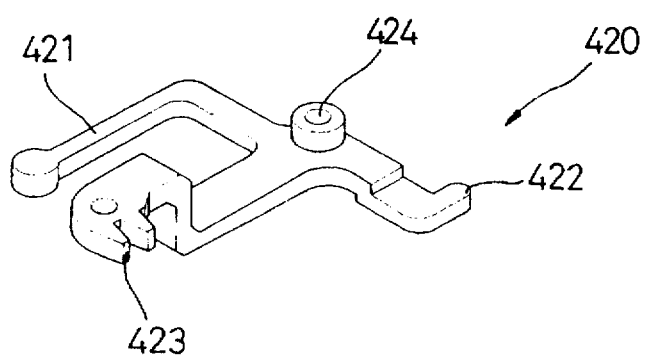
FIG. 31 is a perspective view of a second brake member of the magnetic recording/reproducing apparatus of FIG. 2.
Figure 32:
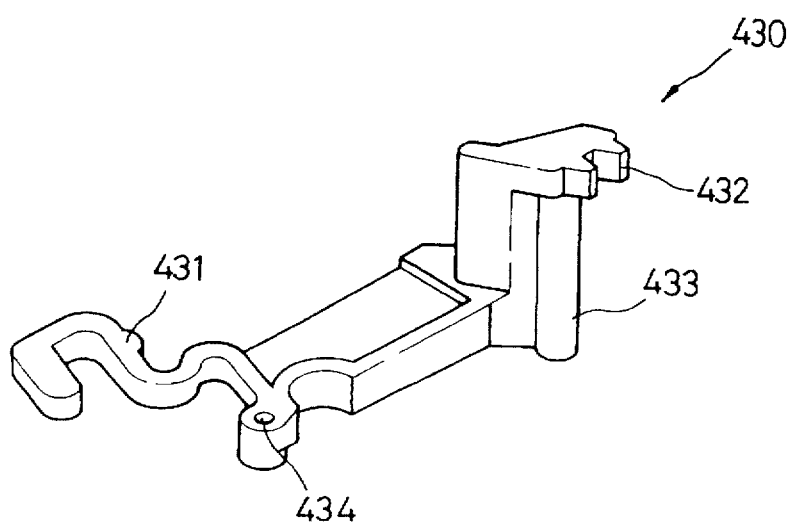
FIG. 32 is a perspective view of a third brake member of the magnetic recording/reproducing apparatus of FIG. 2.

A pair of guide protrusions 101e and 101f separated from each other by a predetermined distance, and a guide pin 101g are formed on the sidewall 101, as shown in FIG. 27. The slide member 460 has a guide piece 465 to be slidably combined between the guide protrusions 101e and 101f, and a guide slot 463 to be combined with the guide pin 101g.

Figure 25A:
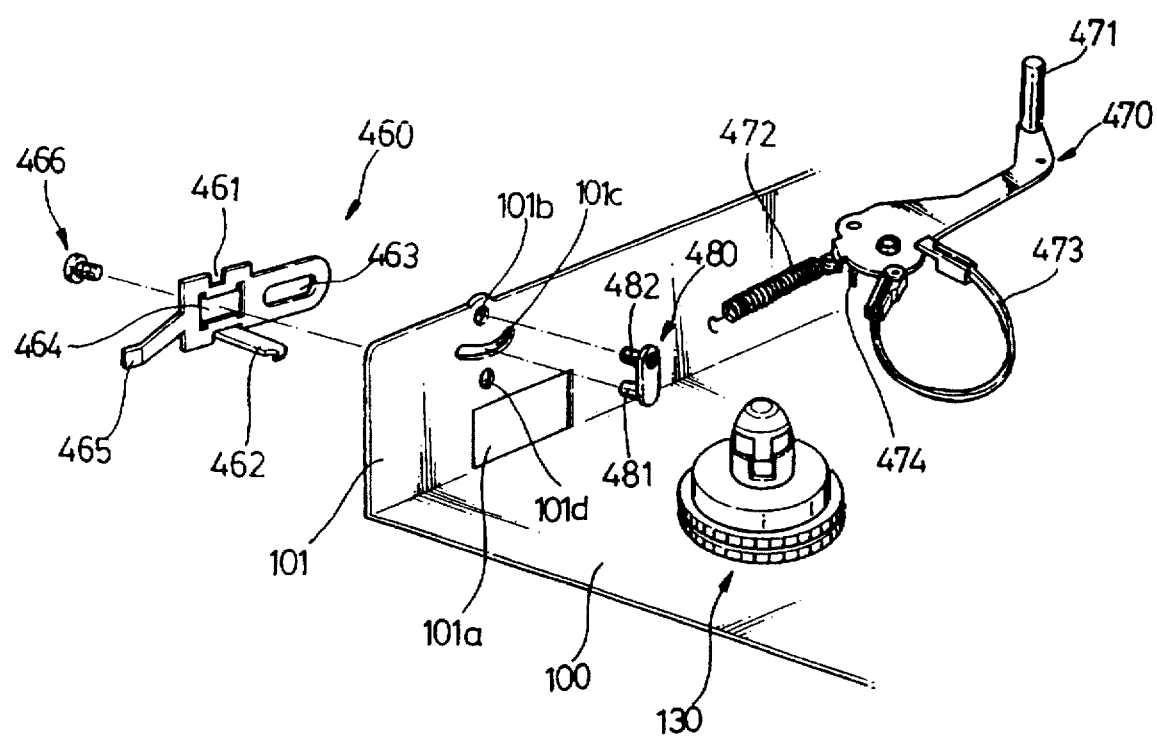
FIG. 25A is an exploded perspective view of a tension controller for a tension arm of the magnetic recording/reproducing apparatus of FIG. 2.
Figure 25B:
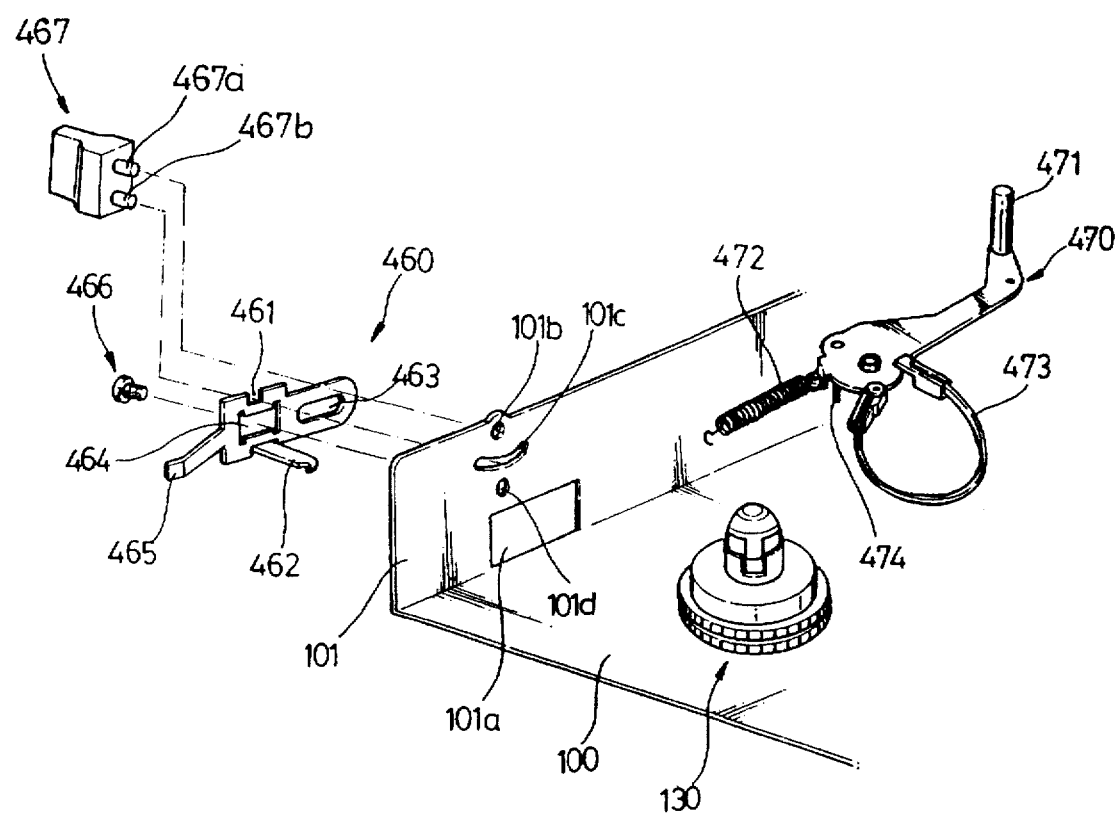
FIG. 25B is an exploded perspective view of another embodiment of the tension controller of the magnetic recording/reproducing apparatus of FIG. 2.
Figure 26:
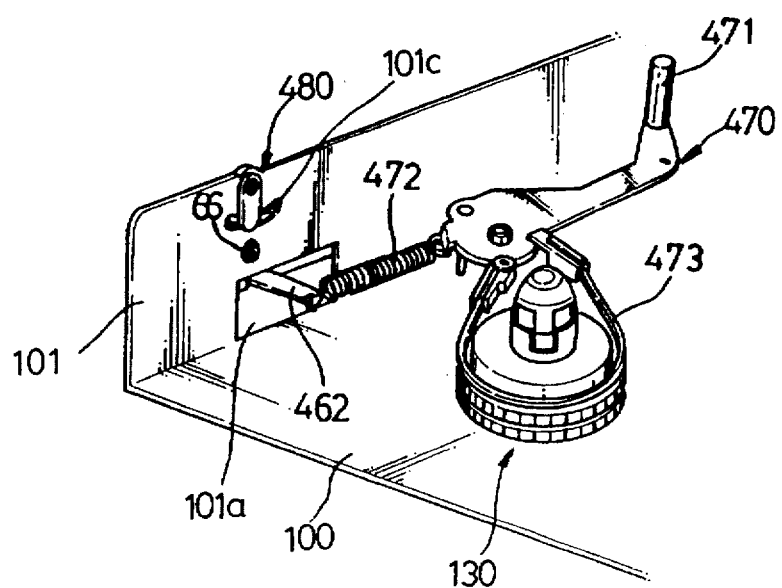
FIG. 26 is an assembled perspective view of the tension controller shown in FIG. 25A.

The transferring means may be constituted as shown in FIG. 25B. That is, the engaging groove 461 is formed in the upper edge of the slide member 460, and the arc slot 101c is formed on the sidewall 101 of the main deck 100. An adjusting member 467 is also provided, which has an engaging pin 467b and a central pin 467a to be combined with the engaging groove 461 and the arc slot 101c, respectively. The slide member 460 can be moved by rotating the adjusting member 467.

Referring to FIGS. 2, 4, 6, 28 and 29, tension maintaining means is provided to maintain the tension of the tape between the tension pole 471 and the guide pole 321 of the first pole base 320.

In the tension maintaining means, a cam protrusion 125 having inclined surfaces 125a and 125c, and a horizontal surface 125b is formed in an edge of the main slide member 120 (see FIG. 6). A pair of fixing pins 118 and 119 spaced apart from each other a predetermined distance are formed on the upper and left part of the main deck 100. A lever member 290 having an impedance roller 291 for guiding the tape is rotatably combined with the fixing pin 118. The lever member 290 is provided with a bush 292 to be combined with the fixing pin 118, and an extension piece 293 extending downward. An interlocking member 295 having a first contact portion 296 for contacting the extension piece 293 and a second contact portion 297 for contacting the cam protrusion 125 of the main slide member 120 is rotatably combined with the interlocking member 295. Reference numeral 298 denotes a central hole to be combined with the fixing pin 119. The bush 292 of the lever member 290 is combined with a torsion spring 294 of which one end is supported by a hook piece 100a formed in one portion of the main deck 100 and the other end is supported by the extension piece 293. Thus, the lever member is elastically biased in a counterclockwise direction.

The tension maintaining means as constituted above operates so that the lever member 290 is rotated by interlocking with the moving main slide member 120, and the impedance roller 291 applies tension to the tape.

Referring to FIGS. 4, 6, and 29–32, brake means is provided to frictionally rotate or brake the reel tables 130 and 140 according to a selected mode. The brake means includes first brake means for frictionally rotating and braking the supply reel table 130, second brake means for frictionally rotating the take-up reel table 140, and third brake means for braking the take-up reel table 140.

In the first brake means, mutually stepped guide protrusions 123 and 124 are formed in a corner of the main slide member 120, along the length of the main slide member 120. The first protrusion 123 has an inclined surface 123a and the second protrusion 124 has a groove 124a. A shaft 137 is formed on the main deck 100, and first and second brake members 410 and 420 are rotatably combined with the shaft 137.

The first brake member 410 has a first interlocking portion 411 for slidingly contacting the first guide protrusion 123, a central hole 414 to be combined with the shaft 137, a contact portion 413 for contacting the outer surface of the reel disk 131 of the supply reel table 130, and a link portion 412 to be linked to the hook piece 100b of the main deck 100 by a spring 415.

The second brake member 420 has a central hole 424 to be combined with the shaft 137, a second interlocking portion 422 for slidingly contacting the second guide protrusion 124, a toothed portion 423 to be engaged with the reel gear 132 of the supply reel table 130, and an elastic hinge portion 421 supported by the hook piece 100b of the main deck 100.

When the main slide member 120 moves, the first and second brake members 410 and 420 are interlocked with the first and second guide protrusions 123 and 124. At this stage, the first brake member 410 contacts/detaches from the reel disk 131, and the second brake member 420 contacts/detaches from the reel gear 132.

Referring to FIGS. 9–11 and 29, in the second brake means, a gear member 440 engaged with the reel gear 142 of the take-up reel table 140, and a latch member 441 coaxially combined with the gear member 440 and having a toothed portion 441a are rotatably installed on the auxiliary plate 180. A spring 442 is disposed between the gear member 440 and the latch member 441. Therefore, the tooth portion 441a rotatingly moves to be engaged with or detached from the reel gear 142, according to the direction of rotation of the reel gear 142.

Referring to FIGS. 4, 9, 10, 29 and 32, in the third brake means, a shaft 138 and a support piece 139 are installed on the main deck 100. A third brake member 430 is rotatably combined with the shaft 138. The third brake member 430 has a central hole 434 to be combined with the shaft 138, an elastic hinge portion 431 supported by the support piece 139, a toothed portion 432 to be engaged with the gear portion 141a of the reel disk 141, and a cam contact portion 433 to contact the cam gear 190.

The third brake member 430 is interlocked with the cam gear 190, thus rotating. Simultaneously, the toothed portion 432 is connected to/detaches from the gear portion 141a of the reel disk 141.

Figure 8:
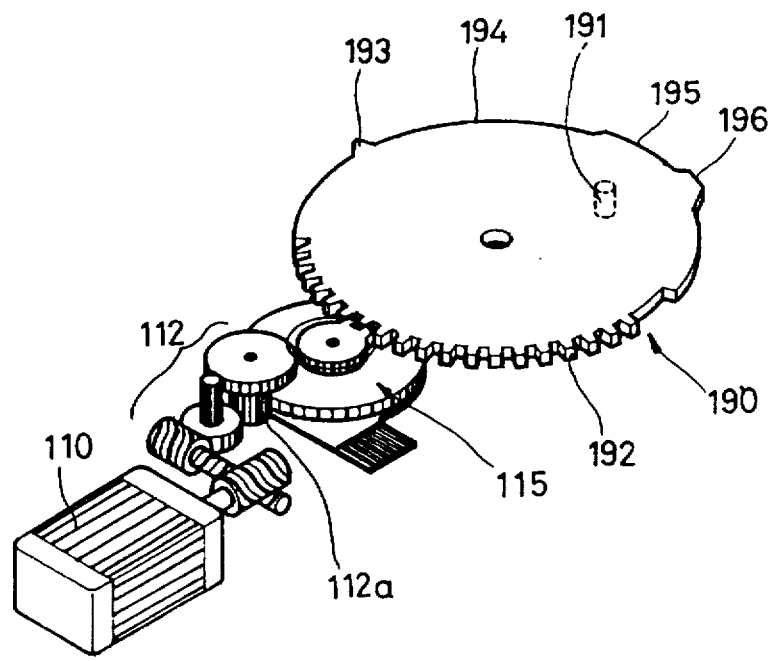
FIG. 8 is a perspective view of important portions of the loading motor and a cam gear of the magnetic recording/reproducing apparatus of FIG. 2.

Referring to FIG. 8, the cam gear 190 has a plurality of cams for interlocking with the third brake member 430 according to a selected mode. That is, the cam gear 190 has a first protrusion portion 193, a circumferential portion 194, and a second protrusion portion 195.

The first protrusion portion 193 is brought into contact with the cam contact portion 433 of the third brake member 430 in an end/start position (ESP) mode. The circumferential portion 194 contacts the cam contact portion 433 in loading and stop modes. The second protrusion portion 195 contacts the cam contact portion 433 in PLAY, FF and REW modes.

Referring to FIGS. 2, 33, 34 and 35, tape sensing means is provided in the lower and right part of the main deck 100 to sense the specification of the magnetic tape in the tape cassette 300 to be placed on the reel tables 130 and 140. The magnetic tape specification includes the tape thickness.

Figure 33:
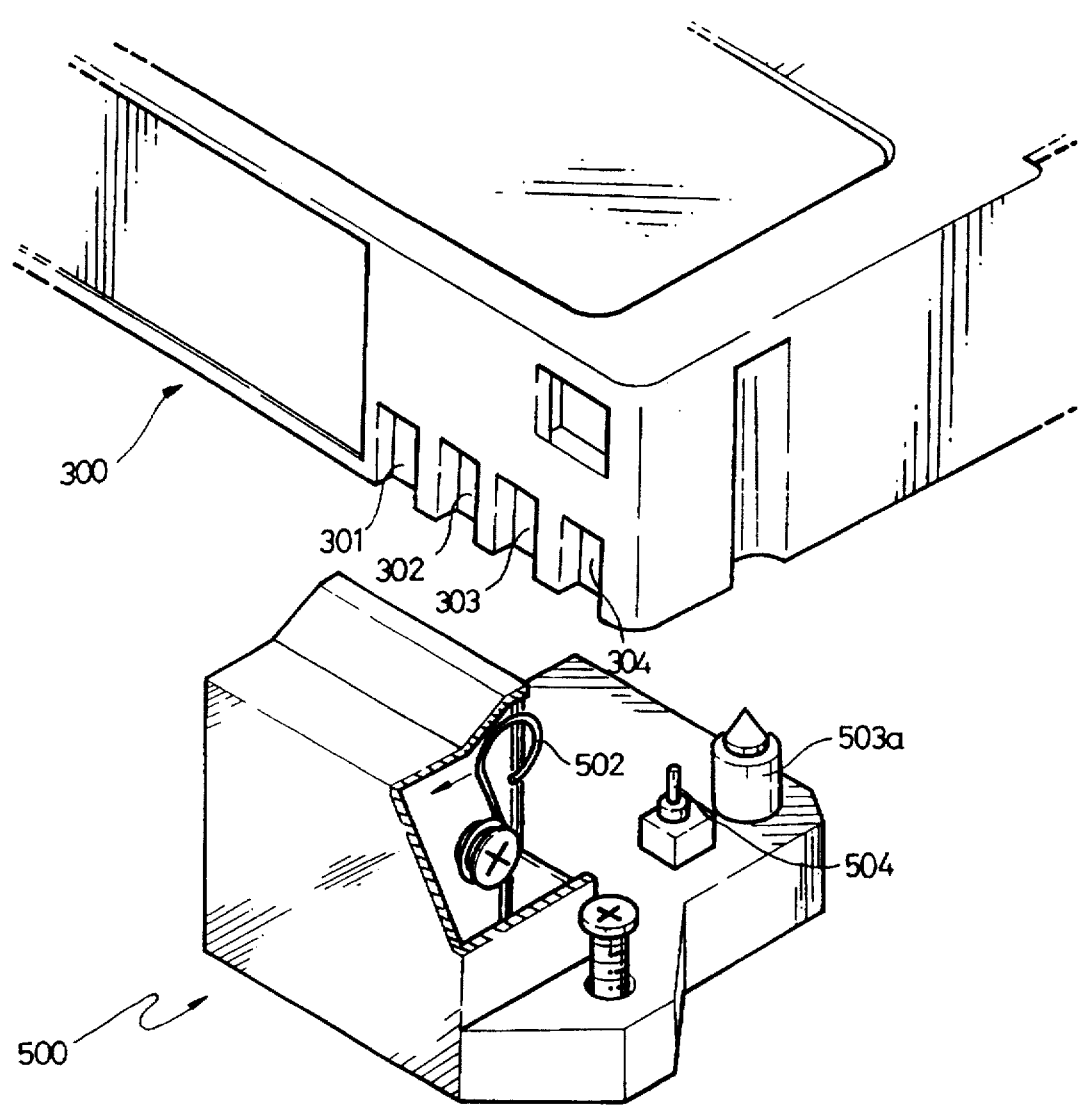
FIG. 33 is a perspective view of an extracted important portion of a tape placing portion in the magnetic recording/reproducing apparatus of FIG. 2.
Figure 34:
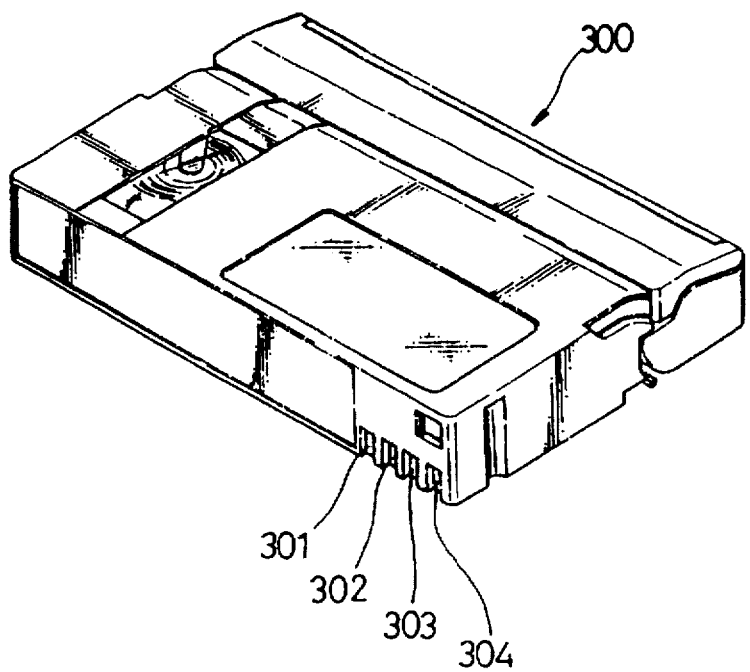
FIG. 34 is a perspective view of a tape cassette of the magnetic recording/reproducing apparatus of FIG. 2.
Figure 35:
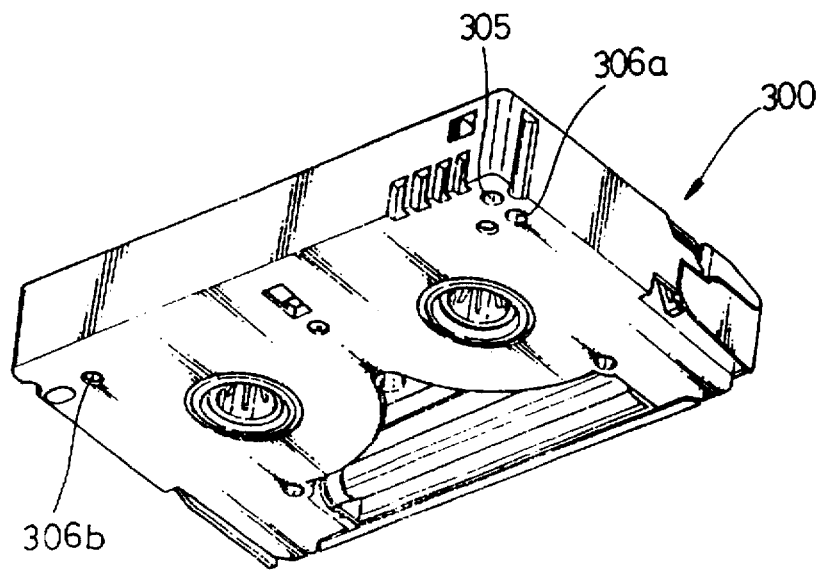
FIG. 35 is a bottom perspective view of the tape cassette shown in FIG. 34.

In the tape sensing means, a plurality of conductive ports 301–304 having predetermined resistance values are provided in an edge of the tape cassette 300. A fixed block 500 having a plurality of plate-like connection ports 501 for contacting the respective conductive ports 301–304 is installed on the main deck 100. Each connection port 501 is connected to a circuit board 600 assembled to the lower surface of the main deck 100. As shown in FIG. 33, the connection ports 501 can be replaced with the torsion spring 502, in the fixed block 500.

Placement holes 306a and 306b are formed on the bottom of the tape cassette 300, and placement pins 503a and 503b to be combined with the placement holes 306a and 306b are formed on the fixed block 500 and the main deck 100, respectively. A recording-prevention hole 305 is formed on the lower surface of the tape cassette 300, and a recording-prevention switch 504 is installed in the fixed block 500. For example, when the hole 305 is closed, the switch 504 operates to prevent recording.

When the tape cassette 300 is placed on the reel tables 130 and 140, the tape specification can be sensed according to the resistance values of the respective conductive ports 301–304. Thus, the mechanism can be properly controlled according to the sensed tape specification.

Referring to FIG. 2, since the circuit board 600 is made of a hard material, it can be assembled to/disassembled from the main deck 100 with a device such as a fixing screw. A first connector 601 to be connected to the loading motor 110 and reel sensors 605 and 606 for sensing the rotational speed of the reel tables 130 and 140 are installed on the circuit board 600. A light emitting device 604 and light receiving devices 602 and 603 are installed on the circuit board 600, as sensors for detecting the start and end of the tape. Prisms 620 and 621 for reflecting light emitted from the light emitting device 604 to the respective light receiving devices 602 and 603 are installed on the sidewalls 101 and 102 of the main deck 100. A flexible circuit board 630 is attached to the lower surface of the circuit board 600. A second connector 607 to be connected to a mode circuit board 610 is installed on the flexible circuit board 630.

The operation of the magnetic recording/reproducing apparatus according to the present invention will be described.

Insertion/placement of Tape Cassette

Referring to FIGS. 2, and 12–18, the tape cassette 300 is inserted into the holder 201. Here, the tape cassette 300 is pressed down by the respective curvatures 205a and 205b and 206a and 206b of the plate spring member 204 inside the holder 201, so that it keeps a stable state.

When the holder 201 accomodating the tape cassette 300 is pressed down, the first and second arm members 210 and 220, and the third and fourth arm members 230 and 240 are mutually rotated and the holder 201 descends. At this stage, the first and second spring members 202 and 203 are stretched, and the fixing pin 222 descends while pressing the locking piece 315d of the locking member 315. The locking member 315 slides and the operational member 313 is pressed by the interlocking piece 315e of the locking member 315. Thus, the operational member 313 rotates clockwise. The fixing pin 315 further descends by a user's pressing down on the holder 201. When the fixing pin 22 is placed under the locking piece 315d, the locking member 315 is restored to its original position by the restoring force of the spring member 314, and the fixing pin 222 is locked with the locking piece 315d.

Then, the holder 201 is locked with the locking piece 315d and thus kept at its current position, as shown in FIG. 18. The tape cassette 300 is stably placed on the reel tables 130 and 140.

End/Start Position

Figure 43:
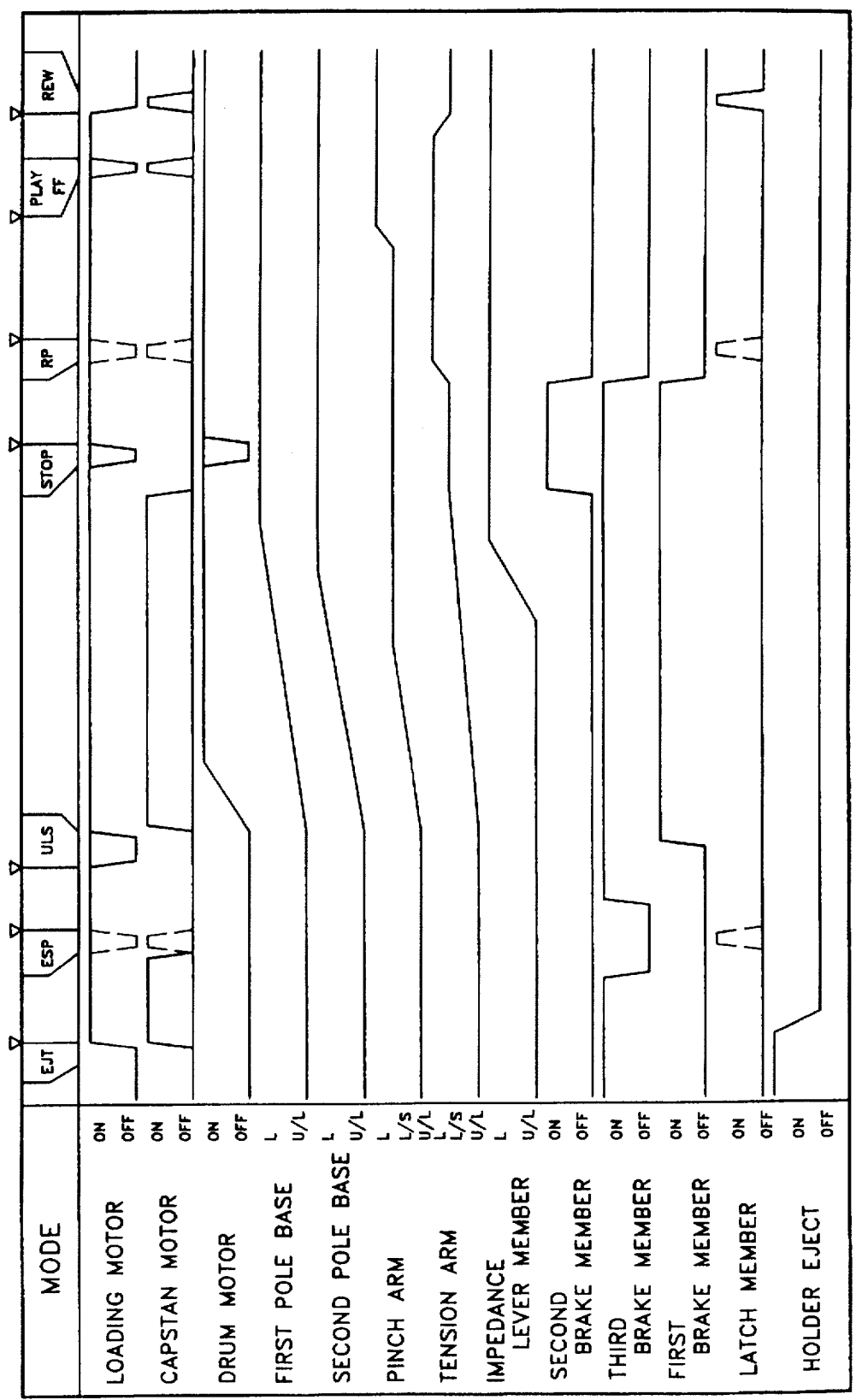
FIG. 43 is a timing chart for the respective modes.

Referring to FIGS. 2, 24 and 43, with the tape cassette 300 stably placed on the reel tables 130 and 140, when the tape is entirely wound around a supply reel, the non-magnetic portion, namely, the transparent portion of the tape, is sensed by the light emitting device 604 and the light receiving device 603. At this stage, the loading motor 110 is off and the capstan motor 105 is on and driven for a predetermined number of steps. Therefore, when only the capstan motor 105 is driven, the driven gear 113 is rotated clockwise by the driving gear 109. At this time, the mobile plate 117 is rotated clockwise together. Then, the second idler 116 engages with the gear portion 141a of the take-up reel table 140. Hence, the take-up reel table 140 takes up the tape, while rotating clockwise when the capstan motor 105 is rotated for the predetermined number of steps.

While the take-up reel table 140 rotates, the third brake member 430 is detached from the gear portion 141a of the reel disk 141 by the protrusion portion 193 of the cam gear 190.

Unloading Mode

The initial deck mechanism, after the tape cassette 300 is accommodated in the holder 201 and stably placed on the reel tables 130 and 140, is positioned as follows.

Figure 36:
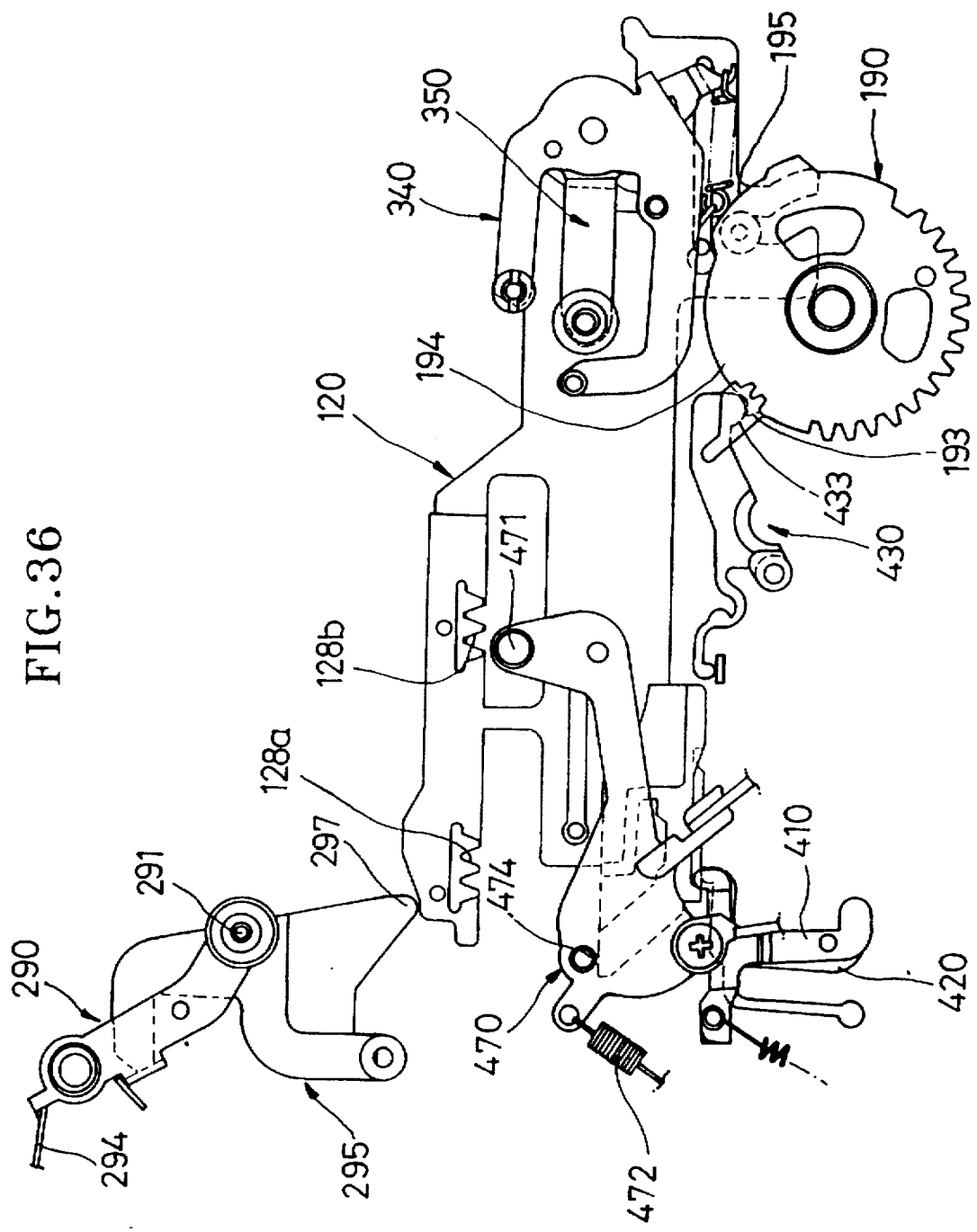
FIGS. 36 and 37 schematically illustrates a deck mechanism in an unloading mode.
Figure 37:
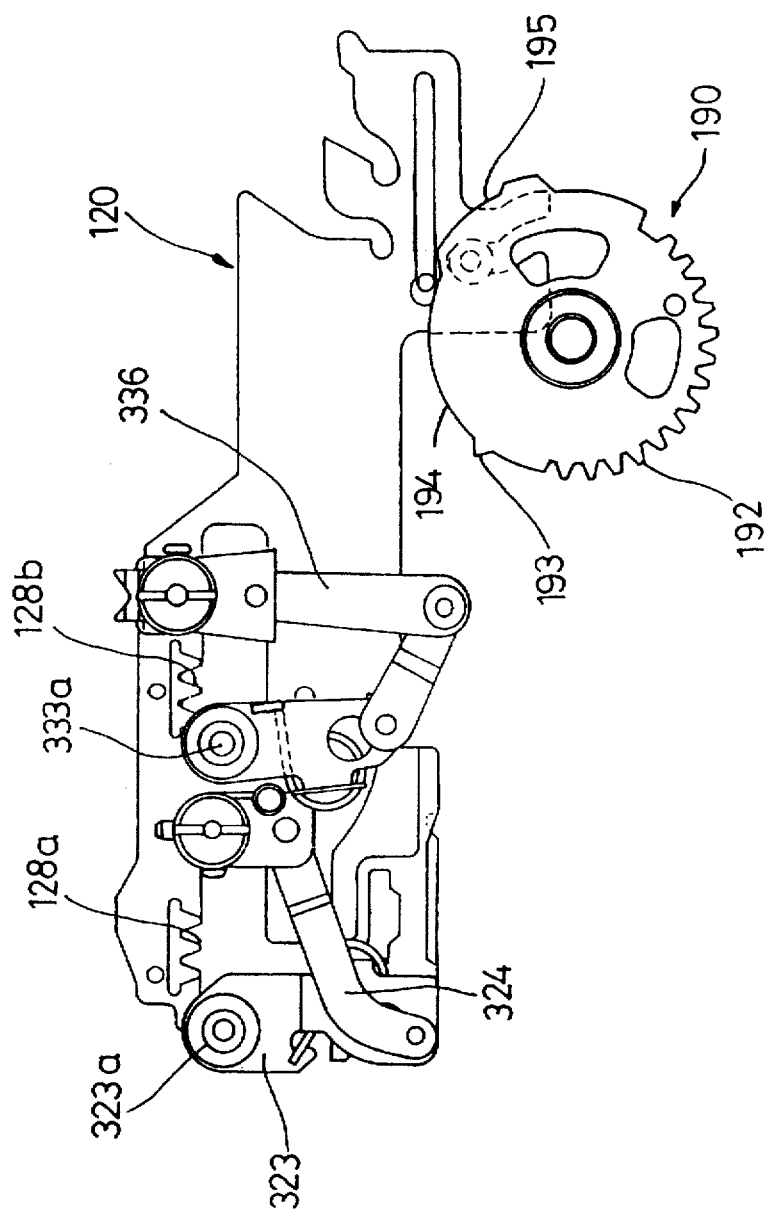

Referring to FIG. 43, and FIGS. 36 and 37 showing a deck mechanism in an unloading mode, the loading motor 110, the capstan motor 105 and a driving motor (not shown) for the head drum 103 are turned off. Thus, the main slide member 120 is at a halt. At this stage, the first brake member 410 is elastically biased counterclockwise by the spring 415, thus pressing the tension band 473 wrapped around the reel disk 131 of the supply reel table 130.

The cam contact portion 433 of the third brake member 430 is brought into contact with the circumferential portion 194 of the cam gear 190, and thus the toothed portion 432 of the third brake member 430 is engaged with the gear portion 141a of the take-up reel disk 141. Hence, the take-up reel table 140 is braked.

The second brake member 420 and the latch member 441 are detached from the reel gears 132 and 142, respectively.

On the other hand, as shown in FIG. 36, the third cam protrusion 474 of the tension arm 470 is placed at the entrance of the third cam guide opening 129 of the main slide member 120. The first cam protrusion 343 of the review arm 340 and the second cam protrusion 361 of the interlocking arm 360 are placed in the inner parts of the first and second cam guide openings 121 and 122 of the main slide member 120. The second contact portion 297 of the interlocking member 295 for interlocking the lever member 290 having the impedance roller 291 is placed below the inclined surface 125a of the cam protrusion portion 125 of the main slide member 120. Referring to FIG. 37, the first and second loading gears 323a and 333a remain unengaged with the first and second rack gear portions 128a and 128b of the main slide member 120.

Loading Mode

Figure 38:
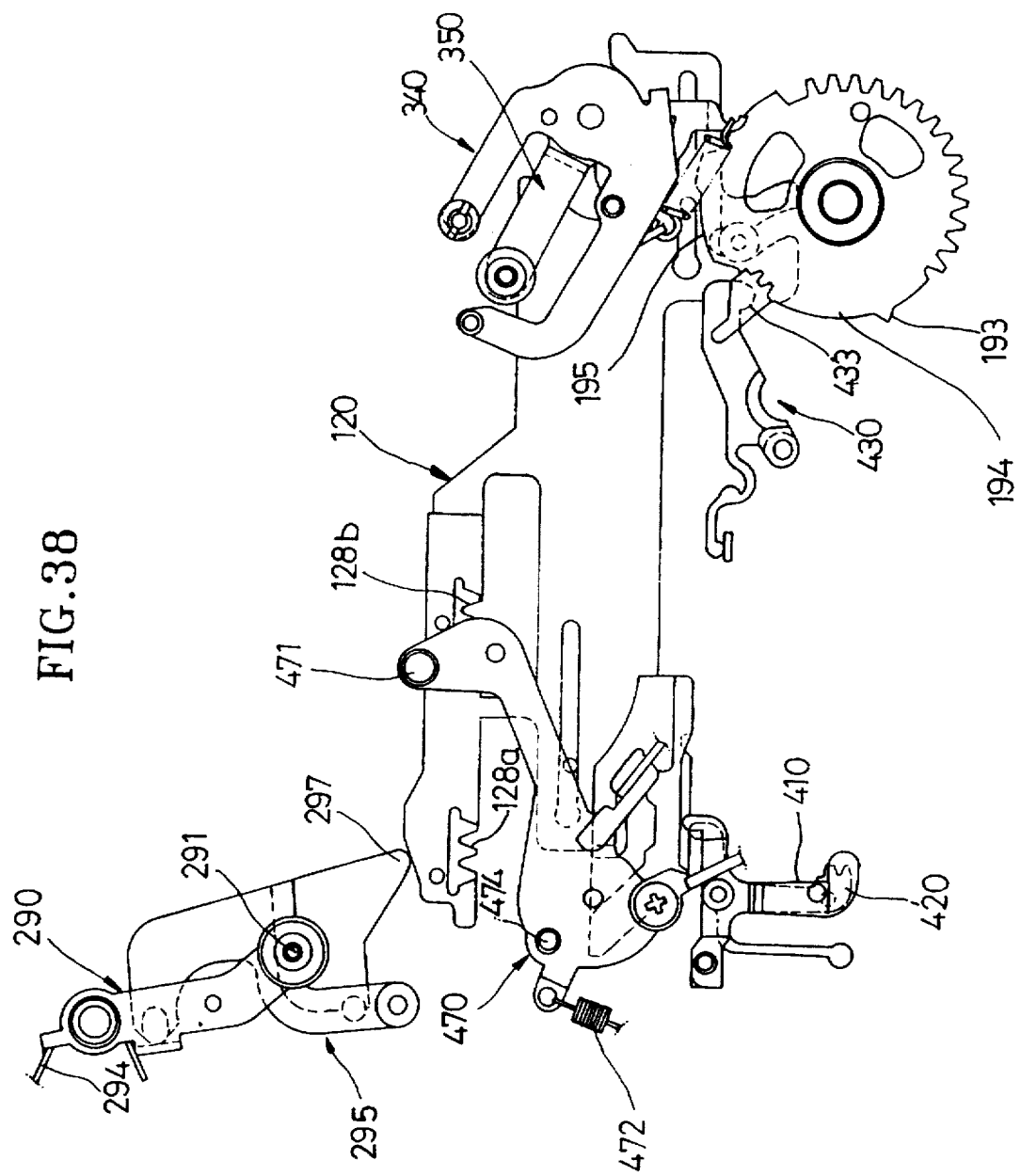
FIGS. 38 and 39 schematically illustrates a deck mechanism in a loading mode.
Figure 39:
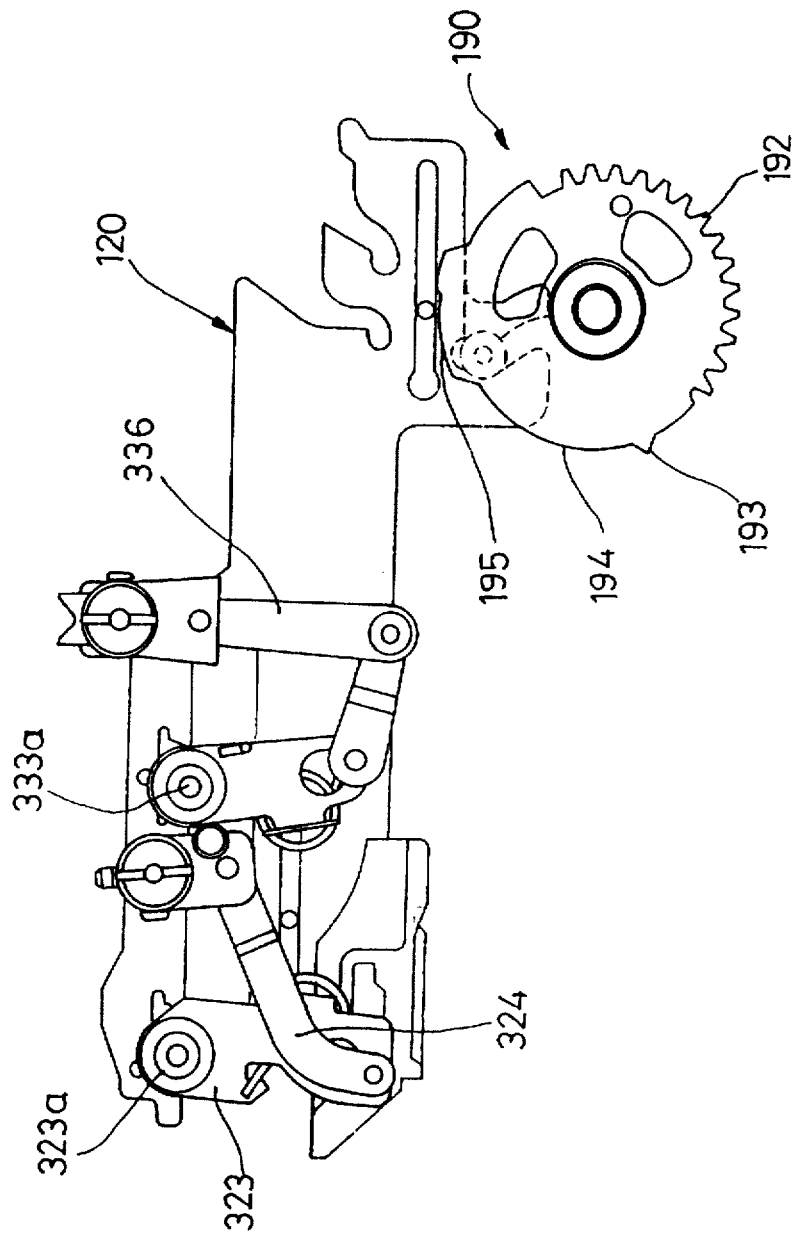

A deck mechanism in a loading mode for extracting the tape from the tape cassette stably placed on the reel tables 130 and 140 and transferring the extracted tape toward the head drum 103 will now be described, referring to FIGS. 38 and 39.

The loading motor 110, the capstan motor 105 and the motor for the head drum 103 are turned on. When the loading motor 110 is operated, its power is transmitted to the mode gear 115 and the cam gear 190 through the gear train 112. While rotating counterclockwise, the cam gear 190 moves the main slide member 120 to the left. During the loading operation, the interlocking protrusion 191 of the cam gear 190 slides along the vertical slot 127a of the cam slot 127 in the main slide member 120.

In the loading mode, the cam contact portion 433 of the third brake member 430 is brought into contact with the circumferential portion 194 of the cam gear 190. Thus, the toothed portion 432 of the third brake member 430 engages with the gear portion 141a of the reel disk 141 of the take-up reel table 140. Accordingly, the reel disk 141 is at a halt. Further, the toothed portion 441a of the latch member 441 is detached from the reel gear 142.

The first brake member 410 presses the outer surface of the supply reel disk 131 by the spring 415, thus applying a predetermined tension on the magnetic tape, and the second brake member 420 is detached from the reel gear 132.

Figure 41:
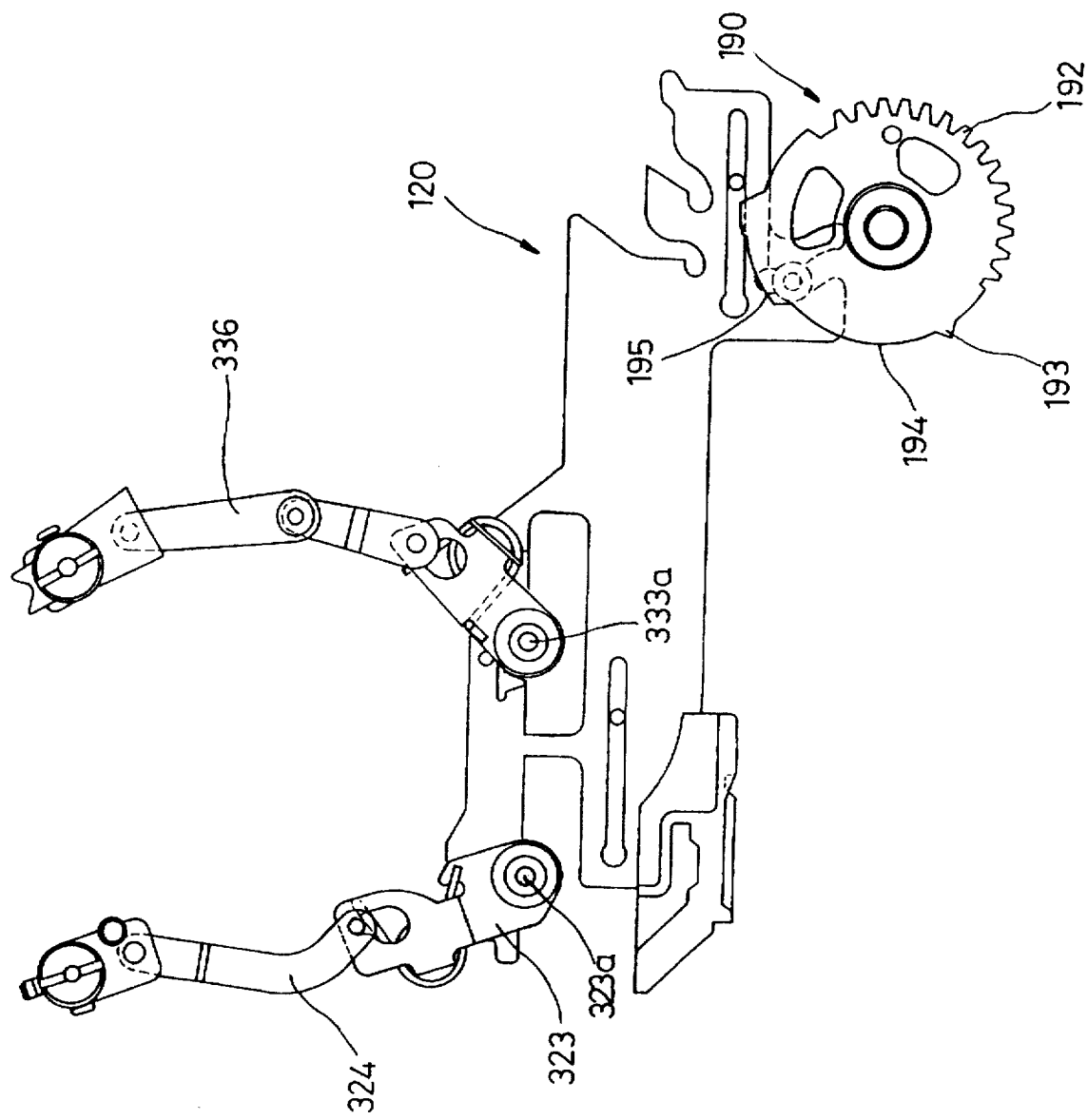

On the other hand, while the main slide member 120 moves to the left, the first and second loading gears 323a and 333a are rotated, being engaged with the first and second rack gear portions 128a and 128b of the main slide member 120. Thus, as shown in FIG. 41, the first and second pole bases 320 and 330 extract the tape from the tape cassette 300 and transfer the tape toward the head drum 103.

At this stage, the lever member 290 having the impedance roller 291 is rotated clockwise by the interlocking member 295. The interlocking member 295 is interlocked with the cam protrusion portion 125 of the main slide member 120 and rotates counterclockwise. At this time, the first contact portion 296 of the interlocking member 295 pushes the extension piece 293 of the lever member 290.

The review arm 340, the pinch arm 350 and the interlocking arm 360 are interlocked with the first and second cam guide openings 121 and 122 of the main slide member 120 and thus rotated clockwise. The pinch roller 351 is moved near to the capstan motor shaft 106.

The third cam protrusion 474 of the tension arm 470 is interlocked with the third cam guide opening 129 of the main slide member 120, and thus the tension arm 470 is rotated counterclockwise.

When the loading operation is completed, the first and second pole bases 320 and 330 are brought into contact with the end portions of the first and second guide slots 165 and 166. At this time, the first and second pole bases 320 and 330 closely contact the end portions of the first and second guide slots 165 and 166 by the respective torsion springs 325 and 335. Hence, the first and second pole bases 320 and 330 are kept stable while the tape is travelling.

As described above, when the first and second pole bases 320 and 330 extract the tape from the tape cassette, the take-up reel table 140 is braked by the third brake member 430 and the supply reel disk 131 is frictionally rotated by the first brake member 410. Thus, the tape can be extracted while only the supply reel disk 131 is rotated.

Stop Mode

Figure 42:
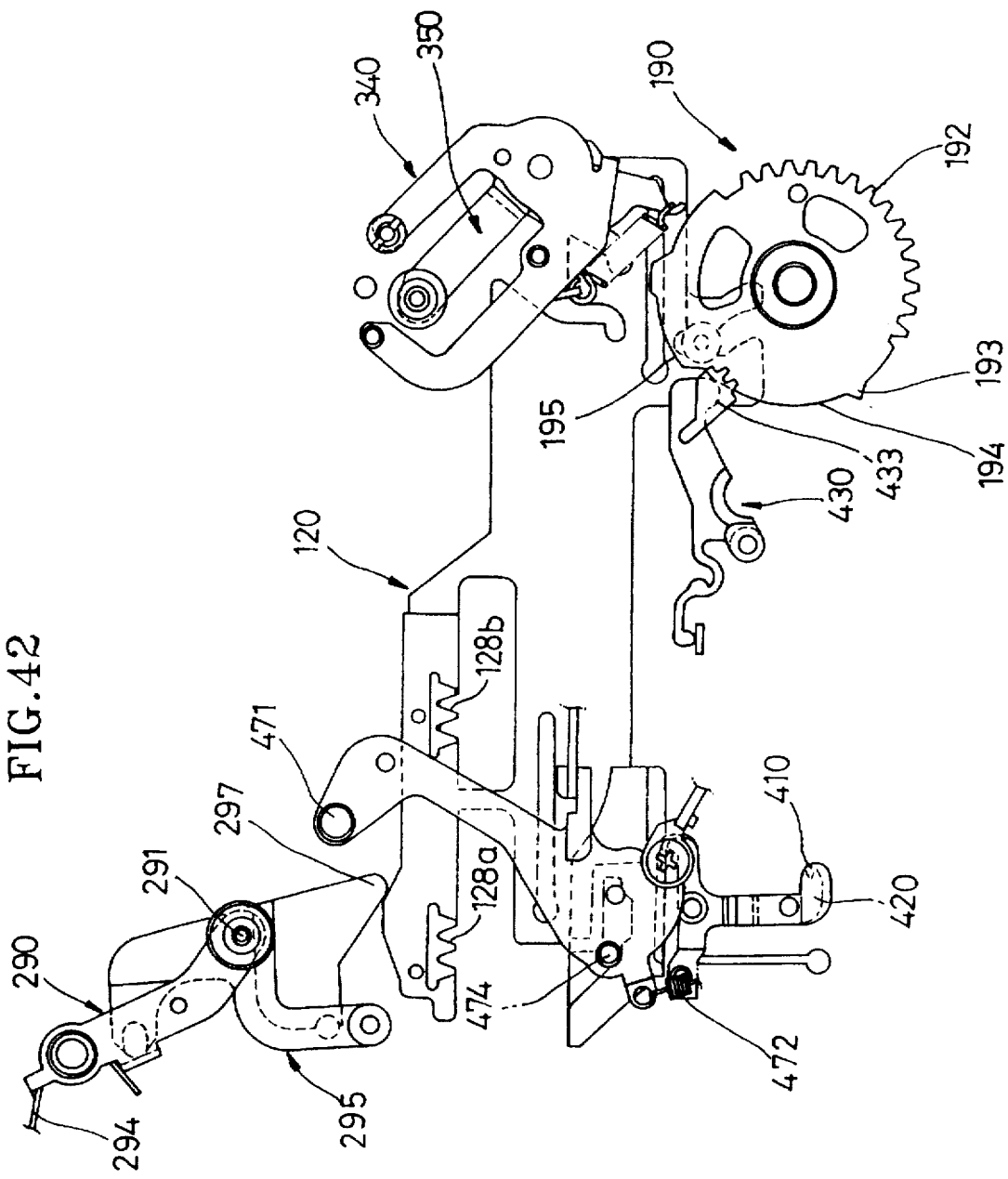
FIG. 42 schematically illustrates a deck mechanism in a stop mode.

Referring to FIG. 42 showing a deck mechanism in a stop mode, the loading motor 110, the capstan motor 105, and the motor for the head drum 103 are turned off. The cam contact portion 433 of the third brake member 430 contacts the circumferential portion 194 of the cam gear 190. Thus, the toothed portion 432 of the third brake member 430 is engaged with the gear portion 141a of the reel disk 141 on the take-up reel table 140. Thus, the reel disk 141 comes to a halt. The tooth portion 441a of the latch member 441 is detached from the reel gear 142.

The first interlocking portion 411 of the first brake member 410 presses against the outer surface of the supply reel disk 131 by the spring 415, while it is placed at the lower part of the inclined surface 123a of the first guide portion 123. When the second interlocking portion 422 of the second brake member 420 is placed in the groove 124a of the second guide protrusion 124, the second brake member 420 is rotated by the restoring force of the elastic hinge portion 421. Thus, the toothed portion 423 of the second brake member 420 is engaged with the reel gear 132.

The third cam protrusion 474 of the tension arm 470 is placed in the center of the third cam guide opening 129 of the main slide member 120. The second contact portion 297 of the interlocking member 295 for interlocking the lever member 290 having the impedance roller 291 is placed on the inclined surface 125c of the main slide member 120.

The review arm 340, the pinch arm 350 and the interlocking arm 360 are interlocked with the first and second cam guide openings 121 and 122, and thus rotated clockwise. The pinch roller 351 is detached from the capstan motor shaft 106. The first cam protrusion 343 of the review arm 340 is released from the first cam guide opening 121 of the main slide member 120, and the second cam protrusion 361 of the interlocking arm 360 is placed in the center of the second cam guide opening 122.

Play Mode

Figure 40:
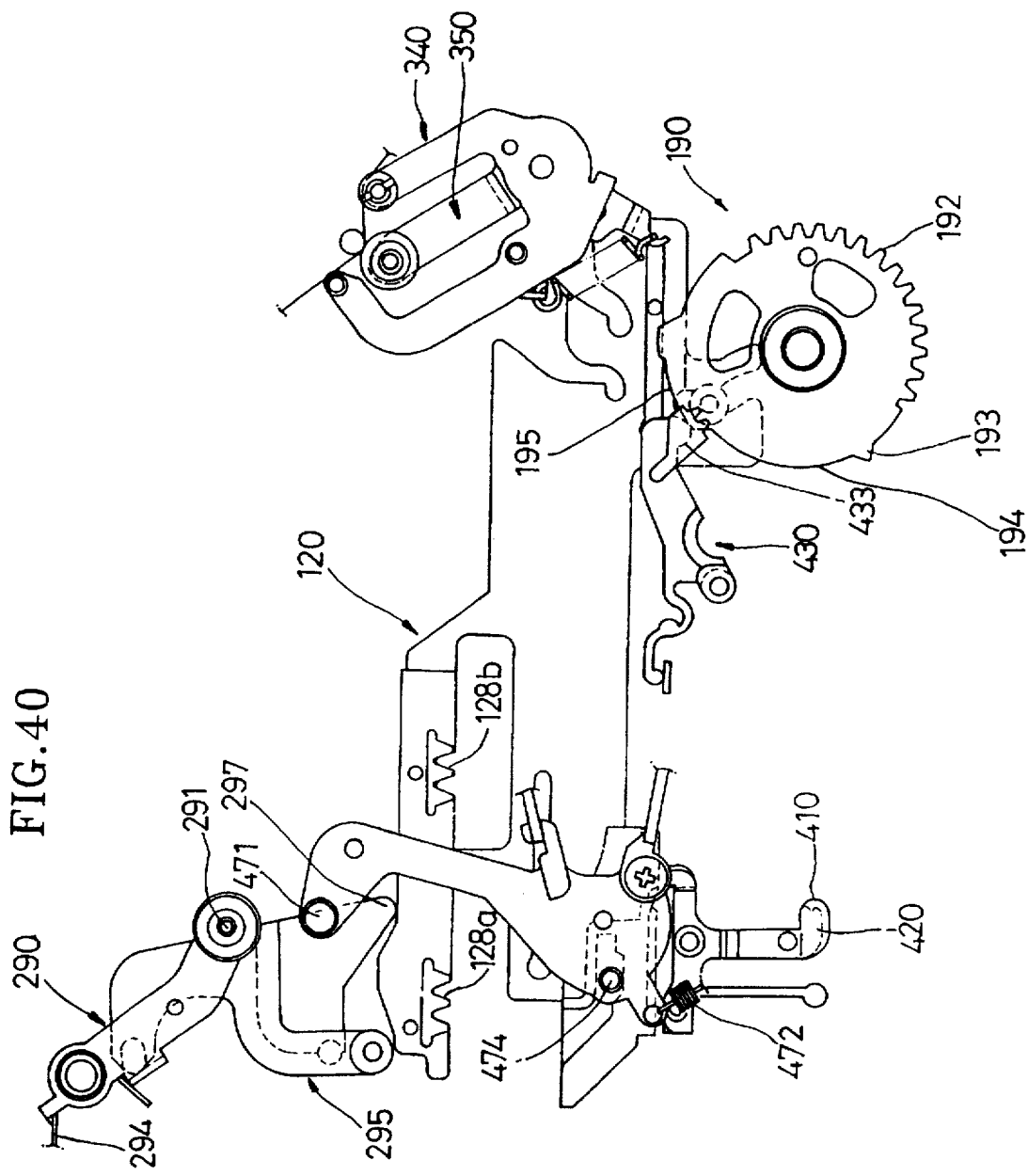
FIGS. 40 and 41 schematically illustrates a deck mechanism in a play mode.

Referring to FIG. 43, and FIGS. 40 and 41 showing a deck mechanism in a play mode, the main slide member 120 moves slightly to the left by the operation of the loading motor 120. Here, the capstan motor 105 remains at a halt, and the driving motor (not shown) for the head drum 103 continues to be operated. The first and second pole bases 320 and 330 closely contact the end portions of the first and second guide slots 165 and 166 by the movement of the main slide member 120, as shown in FIG. 41.

The cam contact portion 433 of the third brake member 430 contacts the first protrusion 195 of the cam gear 190. Thus, the toothed portion 432 of the third brake member 430 detaches from the gear portion 141a of the reel disk 141 of the take-up reel table 140. The toothed portion 441a of the latch member 441 detaches from the reel gear 142.

The first interlocking portion 411 of the first brake member 410 contacts the upper end of the inclined surface 123a of the first guide protrusion 123, and thus the contact portion 413 detaches from the outer surface of the supply reel disk 131.

Since the second interlocking portion 422 of the second brake member 420 is detached from the groove 124e of the second guide protrusion 124, the toothed portion 423 of the second brake member 420 detaches from the reel gear 132.

On the other hand, the third cam protrusion 474 of the tension arm 470 is placed at the lower portion of the third cam guide opening 129 of the main slide member 120. The second contact portion 297 of the interlocking member 295 for interlocking the lever member 290 having the impedance roller 291 contacts the main slide member 120 at a position apart from the inclined surface 125c of the main slide member 120. Here, the interlocking member 295 is rotated clockwise, while the lever member 290 is rotated counterclockwise.

The review arm 340, the pinch arm 350 and the interlocking arm 360 are interlocked with the first and second cam guide openings 121 and 122, and thus rotated clockwise. The pinch roller 351 presses against the capstan motor shaft 106. The first cam protrusion 343 of the review arm 340 is detached from the first cam guide opening 121 of the main slide member 120, and the second cam protrusion 361 of the interlocking arm 360 contacts the upper end of the second cam guide opening 122.

Then, when the capstan motor 105 is operated, the tape is transferred by the pressure of the capstan motor shaft 106 and the pinch roller 351. At the same time, the take-up reel table 140 is rotated clockwise by the power of the capstan motor 105, thus taking up the tape. Accordingly, the magnetic head mounted on the head drum 103 scans information from the travelling tape.

Eject Mode

When the loading motor 110 is operated, the main slide member 120 moves to the right, and the first and second pole bases 320 and 330 are unloaded along the first and second guide slots 165 and 166. The review arm 340, the pinch arm 350 and the interlocking arm 360 are interlocked with the first and second cam guide openings 121 and 122, and thus rotated counterclockwise. The tension arm 470 is interlocked with the third cam guide opening 129, and thus rotated clockwise.

On the other hand, referring to FIGS. 9, 13, 17 and 18, the cam gear 190 is rotated clockwise, and the lock releasing protrusion 196 interlocks with the release piece 315c of the locking member 315. At this stage, the locking member 315 moves to the right. Thus, the locking pin 222 is released from the locking piece 315d, at the same time the holder 201 ascends by the restoring force of the first and second spring members 202 and 203. The restoring force of the first and second spring members 202 and 203 is damped by the damping unit 280 allow the holder 201 to stably ascend.

The magnetic recording/reproducing apparatus according to the present invention exhibits the following advantages:

1. The structure and assembly of the apparatus is simple and small, and can be applied to a small camcorder, since a single main slide member interlocks with a plurality of tape guide devices; and
2. The circuit board 600 is made of a hard material and thus can be assembled to the main deck 100 by screws.

It is contemplated that numerous modifications may be made to the magnetic recording/reproducing apparatus of the present invention without departing from the spirit and scope of the invention as defined in the following claims.

What is claimed is:

1. A magnetic recording/reproducing apparatus comprising:

a main deck having sidewalls at both sides and having disposed thereon a supply reel disk and a take-up reel disk having gear portions on outer surfaces thereof, for placing a tape cassette thereon, a supply reel table and a take-up reel table respectively axially combined with said supply and take-up reel disks and including reel gears having gear portions on outer surfaces thereof, a rotatable head drum having a magnetic head mounted thereon, a capstan motor installed at one side of said head drum and provided with a capstan motor shaft, and a loading motor for supplying a drive force installed at one side of said reel tables;

a main slide member installed on said main deck to slide by the drive force of said loading motor;

a holder assembly rotatably supported by both sidewalls of said main deck, and having a holder for accommodating the tape cassette;

locking means for locking said holder assembly in said main deck and releasing said holder assembly from said main deck;

tape loading means for interlocking with said main slide member and loading a tape from the tape cassette placed on said reel tables toward said head drum;

tape transferring means for interlocking with said main slide member and transferring the tape, while pressing the tape against said capstan motor shaft;

reel driving means for selectively transmitting power of said capstan motor to said supply and take-up reel tables to travel the tape;

tension controlling means for rotating by interlocking with said main slide member and applying a predetermined tension to the travelling tape;

first brake means for interlocking with said main slide member and frictionally rotating/braking said supply reel disk;

second brake means for interlocking with said main slide member and frictionally rotating said take-up reel disk;

third brake means for interlocking with said loading motor and braking said take-up reel disk; and tape sensing means for sensing a specification of the tape of the tape cassette placed on said reel tables.

2. The magnetic recording/reproducing apparatus as claimed in claim 1, wherein said holder assembly comprises:

a holder having guide pins at both sides, for accommodating the tape cassette;

second and fourth arm members having second and fourth slots, respectively, and fixing pins in centers thereof, portions of said second and fourth slots being rotatably combined with the respective sides of said holder, and other portions thereof being slidably combined with both sidewalls of said main deck, respectively;

first and third arm members rotatably combined with said fixing pins, respectively, and having portions with first and third guide slots slidably combined with said guide pins, respectively, having other portions which are connected by a linking shaft, and having centers with respective rotation-central holes rotatably combined with both sidewalls of said main deck;

first and second interlocking levers having portions movably combined with said fixing pins, respectively, and other portions that have engaging slots to be slidably combined with said guide pins, respectively; and first and second spring members for connecting said second and fourth arm members to said first and second interlocking members.

3. The magnetic recording/reproducing apparatus as claimed in claim 2, further comprising damping means for damping the restoring force of said first and second spring members.

4. The magnetic recording/reproducing apparatus as claimed in claim 3, wherein said damping means has a sector gear formed in at least one of said first and second arm members, a cover member having a fixed shaft and a portion for containing a damping material of a predetermined viscosity, and a gear unit having a frictional disk rotatably combined with said fixed shaft for rotating in friction with said damping material and a damping gear engaged with said sector gear.

5. The magnetic recording/reproducing apparatus as claimed in claim 2, wherein said holder has a plate spring member for pressing frontal and rear points of both sides on an upper surface of the tape cassette.

6. The magnetic recording/reproducing apparatus as claimed in claim 5, wherein said plate spring member has a transverse portion fixed to said holder, and first and second extension portions extended orthogonally from both ends of said transverse portion along both sides of said holder and having curved portions for contacting with the upper surface of the tape cassette.

7. The magnetic recording/reproducing apparatus as claimed in claim 1, wherein said holder assembly has at least one pair of arm members for supporting said holder to move up and down with respect to said main deck, at least one of said arm members having a fixing pin, and said locking means comprises:

a fixing plate fixed to one sidewall of said main deck and having a plurality of guide pins;

an operational member rotatably combined with said fixing plate, and having an inclined surface inclined at a predetermined angle on an upper surface of said operational member and a vertical surface vertically extended from said inclined surface;

a locking member slidably combined with said fixing plate and having guide slots to be slidably combined with said guide pins, an interlocking piece to slidably contact said inclined surface and said vertical surface, and a locking piece for locking said fixing pin;

a spring member for connecting said operational member to said locking member; and lock releasing means for moving said locking member in a direction to release said fixing pin from said locking piece.

8. The magnetic recording/reproducing apparatus as claimed in claim 7, wherein a release piece is extended from said locking member, and said lock releasing means comprises a cam gear installed in said main deck to rotate by the drive force of said loading motor and having a lock releasing protrusion formed on the outer surface thereof to interlock said release piece.

9. The magnetic recording/reproducing apparatus as claimed in claim 1, wherein said tape loading means comprises:

a first plate having a first guide surface in one portion thereof and a guide opening having a second guide surface in another portion thereof, for supporting said head drum;

a second plate fixed on said main deck, and having a third guide surface facing said second guide surface;

a third plate installed over said main deck by a predetermined distance and having a first guide rail including a fourth guide surface facing said first guide surface, and a second guide rail connected to said guide opening and said third guide surface;

a pair of loading gears rotatably formed on the lower surface of said first plate, for rotating by interlocking with said main slide member;

first and second pole bases slidably combined with said first and second guide rails and having guide poles guiding the tape, respectively; and a plurality of link members for linking said loading gears to said first and second pole bases.

10. The magnetic recording/reproducing apparatus as claimed in claim 1, wherein a first cam guide opening and a second cam guide opening are formed in said main slide member, and said tape transferring means comprises:

a pinch arm rotatably installed on said main deck and having a pinch roller on the upper surface of said pinch arm, for pressing against said capstan motor shaft;

a review arm rotatably and coaxially installed on said pinch arm and having a first cam protrusion formed on a lower surface of said review arm to be slidably combined with said first cam guide opening;

an interlocking arm rotatably coaxially installed beneath said review arm and having a second cam protrusion formed on a lower surface of said interlocking arm to be slidably combined with said second cam guide opening;

a spring member for connecting one end of said interlocking arm to said pinch arm; and a torsion spring coaxially combined with said pinch arm, of which one end is supported by another end of said interlocking arm and another end is supported by said first cam protrusion.

11. The magnetic recording/reproducing apparatus as claimed in claim 10, wherein first and second guide poles are installed on an upper surface of said review arm to guide the tape in front of and behind said capstan motor shaft.

12. The magnetic recording/reproducing apparatus as claimed in claim 1, wherein said reel driving means comprises a third plate installed over said main deck at a predetermined distance, a driven gear rotatably installed on a lower surface of said third plate, a mobile plate combined with said driven gear to rotate concentrically, first and second idlers rotatably installed on said mobile plate for engaging with said driven gear, a driving gear rotatably installed in said main deck for engaging with said driven gear, and a timing belt for connecting said driving gear to said capstan motor, and wherein said first and second idlers are selectively engaged with said supply and take-up reel tables according to the rotational direction of said driven gear.

13. The magnetic recording/reproducing apparatus as claimed in claim 1, wherein said tension controlling means comprises:

said third plate installed over said main deck at a predetermined distance;

a tension arm rotatably installed on said third plate, and having a tension pole on an end portion of said tension arm for guiding the travelling tape to apply a predetermined back-tension to the travelling tape, and a third cam protrusion for interlocking with said main slide member formed beneath the other end portion of said tension arm;

a spring for elastically biasing said tension arm; and means for controlling the elastic force of said spring.

14. The magnetic recording/reproducing apparatus as claimed in claim 13, wherein said controlling means comprises:

a slide member slidably installed on one sidewall of said main deck and having a hook piece to which one end of said spring is fixed;

means for transferring said slide member; and means for fixing said slide member at a predetermined position on said one sidewall.

15. The magnetic recording/reproducing apparatus as claimed in claim 14, wherein said fixing means comprises an arc slot formed on said one sidewall, a controlling device rotatably installed on said one sidewall and having a controlling pin to be slidably inserted into said arc slot, and combining grooves for combining said controlling pin with said slide member, so that said slide member moves when said controlling device rotates.

16. The magnetic recording/reproducing apparatus as claimed in claim 14, wherein said transferring means comprises a combining groove formed at an upper edge of said slide member, a central hole formed at a sidewall of said main deck, and an adjusting member having a combining pin and a central pin to be combined with said combining groove and said central hole, respectively, so that said slide member moves by rotation of said adjusting member.

17. The magnetic recording/reproducing apparatus as claimed in claim 14, wherein said fixing means includes a fixing screw.

18. The magnetic recording/reproducing apparatus as claimed in claim 13, further comprising means for maintaining the tension of the tape between said tension pole and said head drum.

19. The magnetic recording/reproducing apparatus as claimed in claim 18, wherein a cam protrusion having an inclined surface and a horizontal surface in an edge of said main slide member, and said tension maintaining means comprises:

a lever member rotatably installed on said main deck and having an impedance roller for guiding said tape on an upper surface of said lever member;

a spring member for elastically biasing said lever member;

an interlocking member rotatably installed on said main deck, of which one end is interlocked with a cam contact portion and another end contacts said lever member.

20. The magnetic recording/reproducing apparatus as claimed in claim 1, wherein mutually stepped guide protrusions are formed in a corner of said main slide member, along the length of said main slide member, and said first brake means comprises:

a first brake member rotatably combined with said main deck at one side of said supply reel table and having a first interlocking portion for interlocking with said first guide protrusion, a link portion linked to said main deck by a spring member, and a contact portion for contacting the outer surface of said supply reel disk; and a second brake member rotatably and coaxially installed with said first brake member, and having a second interlocking portion for interlocking with said second guide protrusion, an elastic hinge portion supported by said main deck, and a toothed portion for engaging with said supply reel gear.

21. The magnetic recording/reproducing apparatus as claimed in claim 1, wherein said second brake means comprises:

a rotating shaft fixed on said main deck apart from said take-up reel table by a predetermined distance;

a gear member installed to rotate around said rotating shaft so that said gear member is always engaged with said reel gear;

a latch member installed to rotate around said reel gear and having a tooth portion to be engaged with said reel gear; and a spring member for elastically biasing said latch member toward said gear member.

22. The magnetic recording/reproducing apparatus as claimed in claim 1, wherein said third brake means comprises:

a third brake member having an elastic hinge portion rotatably installed on said main deck and elastically transformed at an end thereof, and a tooth portion to engage with a gear portion of said take-up reel disk at the other end thereof; and a cam gear installed to rotate on said main deck by the drive force of said loading motor and having a cam of a predetermined shape on an outer circumferential surface thereof to make contact with an end portion of said third brake member, wherein said third brake member is rotated by the rotation of said cam gear and thus said tooth portion thereof is connected to and detached from said gear portion of said take-up reel disk.

23. The magnetic recording/reproducing apparatus as claimed in claim 1, wherein said tape sensing means comprises a plurality of conductive terminals having designated resistance values at an edge of the tape cassette; and a plurality of connection terminals, for respectively contacting said conductive terminals, on said main deck.

wherein the specification of a tape is sensed according to the resistance value of each of said conductive terminals when the tape cassette is mounted on said reel tables.

24. The magnetic recording/reproducing apparatus as claimed in claim 23, wherein said conductive terminals and said connection terminals are plates.

25. The magnetic recording/reproducing apparatus as claimed in claim 23, wherein said conductive terminals are plates and said connection terminals are conductive torsion springs.

* * * * *